(12) United States Patent
Zeng et al.

(10) Patent No.: US 10,506,615 B2
(45) Date of Patent: Dec. 10, 2019

(54) METHOD FOR PERFORMING COMMUNICATION BY USING SPECTRUM RESOURCE AND COMMUNICATIONS DEVICE

(71) Applicant: Huawei Technologies Co., Ltd., Shenzhen (CN)

(72) Inventors: Kun Zeng, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 15/610,002

(22) Filed: May 31, 2017

(65) Prior Publication Data

US 2017/0265208 A1 Sep. 14, 2017

Related U.S. Application Data

(63) Continuation of application No. PCT/CN2014/092897, filed on Dec. 3, 2014.

(51) Int. Cl.
*H04W 4/00* (2018.01)
*H04W 72/10* (2009.01)
(Continued)

(52) U.S. Cl.
CPC ......... *H04W 72/10* (2013.01); *H04W 72/005* (2013.01); *H04W 72/0446* (2013.01);
(Continued)

(58) Field of Classification Search
None
See application file for complete search history.

(56) References Cited

U.S. PATENT DOCUMENTS 8,219,129 B2 * 7/2012 Brown ............. H04W 52/0216
455/502
2006/0077912 A1 4/2006 Cheng
(Continued)

FOREIGN PATENT DOCUMENTS

CN 1328759 A 12/2001
CN 1692576 A 11/2005
(Continued)

OTHER PUBLICATIONS

"IEEE Standard for Information technology—Telecommunications and information exchange between systems; Local and metropolitan area networks-Specific requirements; Part 11: Wireless LAN Medium Access Control (MAC) and Physical Layer (PHY) Specifications; Amendment 3: Enhancements for Very High Throughput in the 60 GHz Band," IEEE Computer Society, IEEE Std 802.11ad-2012, Institute of Electrical and Electronics Engineers, New York, New York, (Dec. 28, 2012).
(Continued)

*Primary Examiner* — Bob A Phunkulh
(74) *Attorney, Agent, or Firm* — Leydig, Voit & Mayer, Ltd.

(57) ABSTRACT

Embodiments of the present invention provide a method for performing communication by using a spectrum resource, and a communications device. The method includes: determining, by a first communications device in a first communications system, a first sub-timeslot and a second sub-timeslot in a unit timeslot; and performing, by the first communications device, communication in the first sub-timeslot by using a spectrum resource at a priority higher than that of a second communications device in a second communications system, where a priority at which the first communications device uses the spectrum resource in the second sub-timeslot is lower than a priority at which the second communications device uses the spectrum resource (Continued)

in the second sub-timeslot. The embodiments of the present invention can improve utilization of spectrum resources.

17 Claims, 6 Drawing Sheets

(51) Int. Cl.
*H04W 72/00* (2009.01)
*H04W 72/04* (2009.01)
*H04W 72/12* (2009.01)
*H04W 74/08* (2009.01)
*H04W 28/02* (2009.01)
*H04W 16/08* (2009.01)
*H04W 16/14* (2009.01)

(52) U.S. Cl.
CPC ... *H04W 72/1247* (2013.01); *H04W 72/1252* (2013.01); *H04W 74/0816* (2013.01); *H04W 16/08* (2013.01); *H04W 16/14* (2013.01); *H04W 28/0231* (2013.01); *H04W 74/0808* (2013.01)

(56) References Cited

U.S. PATENT DOCUMENTS

| | | | |
|---|---|---|---|
| 2006/0089099 A1 | 4/2006 | Buchwald et al. | |
| 2008/0074996 A1* | 3/2008 | Fourcand | H04L 1/0086 370/225 |
| 2008/0311922 A1* | 12/2008 | Choi | H04W 48/12 455/450 |
| 2008/0316966 A1* | 12/2008 | Joshi | H04W 74/02 370/330 |
| 2009/0109929 A1* | 4/2009 | Quan | G06K 7/0008 370/332 |
| 2009/0185547 A1* | 7/2009 | Budampati | H04L 45/306 370/345 |
| 2010/0272093 A1* | 10/2010 | Raravi | H04L 1/1887 370/348 |
| 2011/0110340 A1* | 5/2011 | Lakkis | H04W 74/08 370/336 |
| 2011/0222554 A1 | 9/2011 | Kurobe et al. | |
| 2013/0142180 A1* | 6/2013 | Gidlund | H04W 74/085 370/337 |
| 2013/0242905 A1* | 9/2013 | Rasband | H04W 56/0015 370/329 |
| 2013/0329719 A1* | 12/2013 | Chung | H04W 76/27 370/345 |
| 2014/0029499 A1* | 1/2014 | Chu | H04W 52/0206 370/311 |
| 2015/0071060 A1* | 3/2015 | Bhushan | H04W 74/08 370/230 |
| 2015/0078353 A1* | 3/2015 | Zhang | H04W 28/0236 370/336 |
| 2015/0085797 A1* | 3/2015 | Ji | H04J 3/16 370/329 |
| 2015/0098397 A1* | 4/2015 | Damnjanovic | H04W 74/08 370/329 |
| 2015/0098412 A1* | 4/2015 | Yerramalli | H04W 16/14 370/329 |
| 2015/0110012 A1* | 4/2015 | Bhushan | H04W 74/08 370/329 |
| 2015/0148053 A1* | 5/2015 | Patel | H04W 72/0426 455/452.1 |
| 2015/0201429 A1* | 7/2015 | Chen | H04W 72/1226 370/329 |
| 2015/0245411 A1* | 8/2015 | Damnjanovic | H04W 74/08 370/328 |
| 2016/0338107 A1 | 11/2016 | Zeng et al. | |
| 2017/0086224 A1* | 3/2017 | Wilhelmsson | H04W 72/121 |
| 2018/0270835 A1* | 9/2018 | Chen | H04W 72/082 |

FOREIGN PATENT DOCUMENTS

| | | |
|---|---|---|
| CN | 1809004 A | 7/2006 |
| CN | 101199135 A | 6/2008 |
| CN | 101790239 A | 7/2010 |
| CN | 105027600 A | 11/2015 |
| EP | 1133888 B1 | 8/2004 |
| EP | 3094124 A1 | 11/2016 |
| WO | 2015113252 A1 | 8/2015 |

OTHER PUBLICATIONS

"IEEE Standard for Information technology—Telecommunications and information exchange between systems; Local and metropolitan area networks-Specific requirements; Part 11: Wireless LAN Medium Access Control (MAC) and Physical Layer (PHY) Specifications," IEEE Computer Society, IEEE Std 802.11-2012, Institute of Electrical and Electronics Engineers, New York, New York, (Mar. 29, 2012).

* cited by examiner

METHOD FOR PERFORMING COMMUNICATION BY USING SPECTRUM RESOURCE AND COMMUNICATIONS DEVICE

CROSS-REFERENCE TO RELATED APPLICATIONS

This application is a continuation of International Application No. PCT/CN2014/092897, filed on Dec. 3, 2014, the disclosure of which is hereby incorporated by reference in its entirety.

TECHNICAL FIELD

The present invention relates to communications systems, and in particular, to a method for performing communication by using a spectrum resource and a communications device.

BACKGROUND

A radio spectrum resource is a scarce strategic resource. Spectrum resources may be classified into two types: licensed bands and unlicensed bands. For example, spectrum resources used by technologies such as Wireless Fidelity (Wi-Fi) and Bluetooth, are generally open to the public for free and without a need of license, and are referred to as unlicensed bands.

Due to scarcity of the spectrum resources, allocated licensed bands cannot meet future requirements. To obtain new spectrums, unlicensed bands may be used as a beneficial supplement to the licensed bands.

However, unlicensed bands intended to be deployed by a 3rd Generation Partnership Project (3GPP) system have been already deployed/are being deployed in another system. The Wi-Fi technology uses unlicensed bands, such as 5 GHz bands used by 802.11a/n/ac and 60 GHz bands used by 802.11ad.

Generally, a Wi-Fi system includes one access point (AP) and several stations (STAs). In a 3GPP system, spectrum resources are generally used in a synchronization frame-based continuous scheduling manner in which a base station (BS) performs centralized control. In a Wi-Fi system, a technology referred to as Carrier Sensing Multiple Access/ Collision Avoidance (CSMA/CA) is used to obtain resources by means of contention. A working principle thereof is: First, the Wi-Fi system waits until a medium (that is, a spectrum) resource is "idle", then a station (or an access point) starts waiting for a random time period, during which carrier sensing (CS) continues. If the resource still keeps "idle" after waiting time ends, the station starts transmission. The transmission has constraints on a data size and duration. When the constraints are triggered, even if a service still exists, the station needs to contend for a resource again.

A Wi-Fi system uses unlicensed spectrum resources based on a CSMA/CA manner. When interference occurs, the Wi-Fi system actively waits, and evades a signal of the 3GPP system. As a result, the 3GPP system occupies the unlicensed spectrum resources for a long time, whereas the Wi-Fi system is in an interference-evading and waiting state all the time.

To overcome the foregoing technical problem, in the prior art, some subframes are vacated in a frame structure in the 3GPP system and reserved for the Wi-Fi system, and fair use of the unlicensed spectrum resources by the two systems is achieved by adjusting a vacancy rate.

However, in the foregoing technical solution, if the Wi-Fi system does not have or have few service requirements in the subframe, a waste of spectrum resources is caused.

SUMMARY

The present invention provides a method for performing communication by using a spectrum resource and a communications device, so as to improve utilization of spectrum resources.

According to a first aspect, a method for performing communication by using a spectrum resource, including: determining, by a first communications device in a first communications system, a first sub-timeslot and a second sub-timeslot in a unit timeslot; and performing, by the first communications device, communication in the first sub-timeslot by using a spectrum resource at a priority higher than that of a second communications device in a second communications system, where a priority at which the first communications device uses the spectrum resource in the second sub-timeslot is lower than a priority at which the second communications device uses the spectrum resource in the second sub-timeslot.

In a first possible implementation, the performing, by the first communications device, communication in the first sub-timeslot by using the spectrum resource at a priority higher than that of a second communications device includes: performing, by the first communications device, communication in the first sub-timeslot by continuously using the spectrum resource, so that the second communications device performs communication in the first sub-timeslot by using the spectrum resource when the first communications device does not use the spectrum resource.

With reference to the first aspect or the first possible implementation, in a second possible implementation, the method in the first aspect further includes: performing, by the first communications device, communication in the second sub-timeslot by using the spectrum resource when the second communications device does not use the spectrum resource.

With reference to the first aspect or any one of the foregoing possible implementations, in a third possible implementation, duration for which the spectrum resource is idle when the first communications device performs communication in the first sub-timeslot by using the spectrum resource is less than duration for which the second communications device waits to preempt the spectrum resource.

With reference to the first aspect or any one of the foregoing possible implementations, in a fourth possible implementation, duration for which the spectrum resource is idle when the first communications device performs communication in the second sub-timeslot by using the spectrum resource is greater than duration for which the second communications device waits to preempt the spectrum resource.

With reference to the first aspect or the fourth possible implementation, in a fifth possible implementation, the first communications device performs communication in the second sub-timeslot in a first listen before talk (LBT) manner by using the spectrum resource, and the second communications device performs communication in the second sub-timeslot in a second listen before talk manner by using the spectrum resource; distributed inter-frame spacing (DIFS) duration in the first listen before talk manner is greater than DIFS duration in the second listen before talk manner; or duration between a start moment at which the spectrum resource is idle in the first listen before talk manner and a start moment of a contention window in the first listen before talk manner is greater than duration between a start moment at which the spectrum resource is idle in the second listen before talk manner and the start moment of the contention window in the first listen before talk manner; and the duration for which the second communications device waits to preempt the spectrum resource includes a sum of the DIFS duration in the second listen before talk manner and duration of a contention window in the second listen before talk manner.

With reference to the first aspect or the fourth possible implementation, in a sixth possible implementation, the first communications device performs communication in the second sub-timeslot in a first listen before talk manner by using the spectrum resource, and the second communications device performs communication in the second sub-timeslot in a second listen before talk manner by using the spectrum resource; a minimum value of duration of a contention window in the first listen before talk manner is greater than a minimum value of duration of a contention window in the second listen before talk manner; and/or a maximum value of duration of a contention window in the first listen before talk manner is greater than a maximum value of duration of a contention window in the second listen before talk manner; and the duration for which the second communications device waits to preempt the spectrum resource includes a sum of DIFS duration in the second listen before talk manner and the duration of the contention window in the second listen before talk manner.

With reference to the fifth possible implementation or the sixth possible implementation, in a seventh possible implementation, before the performing, by the first communications device, communication in the first sub-timeslot by using a spectrum resource at a priority higher than that of a second communications device in a second communications system, the method in the first aspect further includes: obtaining, by the first communications device, current load information of the second communications device, and determining, by the first communications device, the DIFS duration in the first listen before talk manner and the duration of the contention window in the first listen before talk manner according to the current load information of the second communications device.

With reference to the first aspect or any one of the foregoing possible implementations, in an eighth possible implementation, before the performing, by the first communications device, communication in the first sub-timeslot by using a spectrum resource at a priority higher than that of a second communications device, the method in the first aspect further includes: broadcasting, by the first communications device, network allocation vector information at a start moment of the first sub-timeslot, where the network allocation vector information is used to indicate that the spectrum resource is in a busy state, and the network allocation vector information includes duration of the first sub-timeslot, so that the second communications device does not use the spectrum resource in the duration of the first sub-timeslot.

With reference to the first aspect or any one of the foregoing possible implementations, in a ninth possible implementation, before the determining, by a first communications device in a first communications system, a first sub-timeslot and a second sub-timeslot in a unit timeslot, the method in the first aspect further includes: determining, by the first communications device, duration of the unit timeslot; and dividing, by the first communications device, the spectrum resource into multiple unit timeslots in a time domain according to the determined duration of the unit timeslot, where the unit timeslot is one of the multiple unit timeslots, where the determining, by a first communications device in a first communications system, a first sub-timeslot and a second sub-timeslot in a unit timeslot includes: determining, by the first communications device, percentages of the first sub-timeslot and the second sub-timeslot in the unit timeslot; and dividing, by the first communications device, each unit timeslot of the multiple timeslots into the first sub-timeslot and the second sub-timeslot according to the determined percentages of the first sub-timeslot and the second sub-timeslot in the unit timeslot.

With reference to the first aspect or the ninth possible implementation, in a tenth possible implementation, before the determining, by the first communications device, percentages of the first sub-timeslot and the second sub-timeslot in the unit timeslot, the method in the first aspect further includes: obtaining, by the first communications device, the load information of the second communications device; and the determining, by the first communications device, percentages of the first sub-timeslot and the second sub-timeslot in the unit timeslot includes: determining, by the first communications device, the percentages of the first sub-timeslot and the second sub-timeslot in the unit timeslot according to the current load information of the second communications device.

With reference to the first aspect or the ninth possible implementation, in an eleventh possible implementation, before the determining, by the first communications device, duration of the unit timeslot, the method in the first aspect further includes: obtaining, by the first communications device, a real-time requirement of the second communications device; and the determining, by the first communications device, duration of the unit timeslot includes: determining, by the first communications device, the duration of the unit timeslot according to the real-time requirement of the second communications device.

With reference to the first aspect or any one of the foregoing possible implementations, in a twelfth possible implementation, the spectrum resource is an unlicensed spectrum resource shared by the first communications system and at least one second communications system, where a second communications device in the at least one second communications system performs communication in a listen before talk (LBT) manner by using the unlicensed spectrum resource; or the spectrum resource is a licensed spectrum resource shared by the first communications system and at least one second communications system, where a second communications device in the at least one second communications system performs communication in a listen before talk (LBT) manner by using the licensed spectrum resource.

With reference to the first aspect or any one of the foregoing possible implementations, in a thirteenth possible implementation, the first communications system is a cellular communications system, the second communications system is a wireless local area network communications system, the first communications device is a base station or user equipment, and the second communications device is a wireless access point or a station; or both the first communications system and the second communications system are cellular communications systems, and both the first communications device and the second communications device are base stations or user equipment.

According to a second aspect, a communications device is provided, including: a determining module, configured to determine a first sub-timeslot and a second sub-timeslot in a unit timeslot; and a communications module, configured to perform communication in the first sub-timeslot by using a spectrum resource at a priority higher than that of a second communications device, where the communications device in the second aspect is a communications device in a first communications system, and a priority at which the communications device uses the spectrum resource in the second sub-timeslot is lower than a priority at which the second communications device uses the spectrum resource in the second sub-timeslot.

In a first possible implementation, the communications module performs communication in the first sub-timeslot by continuously using the spectrum resource, so that the second communications device performs communication in the first sub-timeslot by using the spectrum resource when the communications device does not use the spectrum resource.

With reference to the second aspect or the first possible implementation of the second aspect, in a second possible implementation, the communications module further performs communication in the second sub-timeslot by using the spectrum resource when the second communications device does not use the spectrum resource.

With reference to the second aspect or any one of the foregoing possible implementations, in a third possible implementation, duration for which the spectrum resource is idle when the communications module performs communication in the first sub-timeslot by using the spectrum resource is less than duration for which the second communications device waits to preempt the spectrum resource.

With reference to the second aspect or any one of the foregoing possible implementations, in a fourth possible implementation, duration for which the spectrum resource is idle when the communications module performs communication in the second sub-timeslot by using the spectrum resource is greater than duration for which the second communications device waits to preempt the spectrum resource.

With reference to the second aspect or the fourth possible implementation of the second aspect, in a fifth possible implementation, the communications module performs communication in the second sub-timeslot in a first listen before talk (LBT) manner by using the spectrum resource, and the second communications device performs communication in the second sub-timeslot in a second listen before talk manner by using the spectrum resource, where DIFS duration in the first listen before talk manner is greater than DIFS duration in the second listen before talk manner; or duration between a start moment at which the spectrum resource is idle in the first listen before talk manner and a start moment of a contention window in the first listen before talk manner is greater than duration between a start moment at which the spectrum resource is idle in the second listen before talk manner and the start moment of the contention window in the first listen before talk manner, where the duration for which the second communications device waits to preempt the spectrum resource includes a sum of the DIFS duration in the second listen before talk manner and duration of a contention window in the second listen before talk manner.

With reference to the second aspect or the fourth possible implementation of the second aspect, in a sixth possible implementation, the communications module performs communication in the second sub-timeslot in a first listen before talk manner by using the spectrum resource, and the second communications device performs communication in the second sub-timeslot in a second listen before talk manner by using the spectrum resource, where a minimum value of duration of a contention window in the first listen before talk manner is greater than a minimum value of duration of a contention window in the second listen before talk manner; and/or a maximum value of duration of a contention window in the first listen before talk manner is greater than a maximum value of duration of a contention window in the second listen before talk manner, where the duration for which the second communications device waits to preempt the spectrum resource includes a sum of DIFS duration in the second listen before talk manner and the duration of the contention window in the second listen before talk manner.

With reference to the fifth possible implementation or the sixth possible implementation of the second aspect, in a seventh possible implementation, the communications module is further configured to obtain current load information of the second communications device before performing communication in the first sub-timeslot by using the spectrum resource at the priority higher than that of the second communications device in a second communications system, where the determining module is further configured to determine the DIFS duration in the first listen before talk manner and the duration of the contention window in the first listen before talk manner according to the current load information of the second communications device.

With reference to the second aspect or any one of the foregoing possible implementations, in an eighth possible implementation, before performing communication in the first sub-timeslot by using the spectrum resource at the priority higher than that of the second communications device, the communications module further broadcasts network allocation vector information at a start moment of the first sub-timeslot, and performs communication in duration of the first sub-timeslot by using the spectrum resource, where the network allocation vector information is used to indicate that the spectrum resource is in a busy state, and the network allocation vector information includes the duration of the first sub-timeslot, so that the second communications device does not use the spectrum resource in the duration of the first sub-timeslot.

With reference to the second aspect or any one of the foregoing possible implementations, in a ninth possible implementation, the determining module is further configured to: before determining the first sub-timeslot and the second sub-timeslot in the unit timeslot, determine duration of the unit timeslot; determine percentages of the first sub-timeslot and the second sub-timeslot in the unit timeslot, where the unit timeslot is one of the multiple unit timeslots; divide the spectrum resource into multiple unit timeslots in a time domain according to the determined duration of the unit timeslot, and divide each unit timeslot of the multiple timeslots into the first sub-timeslot and the second sub-timeslot according to the determined percentages of the first sub-timeslot and the second sub-timeslot in the unit timeslot.

With reference to the second aspect or the ninth possible implementation, in a tenth possible implementation, the communications module is further configured to obtain current load information of the second communications device before the determining module determines the percentages of the first sub-timeslot and the second sub-timeslot in the unit timeslot, where the determining module determines the percentages of the first sub-timeslot and the second sub-timeslot in the unit timeslot according to the current load information of the second communications device.

With reference to the second aspect or the ninth possible implementation, in an eleventh possible implementation, the communications module is further configured to obtain a real-time requirement of the second communications device before the determining module determines the duration of the unit timeslot, where the communications module determines the duration of the unit timeslot according to the real-time requirement of the second communications device.

With reference to the second aspect or any one of the foregoing possible implementations, in a twelfth possible implementation, the spectrum resource is an unlicensed spectrum resource shared by the first communications system and at least one second communications system, where a second communications device in the at least one second communications system performs communication in a listen before talk (LBT) manner by using the unlicensed spectrum resource; or the spectrum resource is a licensed spectrum resource shared by the first communications system and at least one second communications system, where a second communications device in the at least one second communications system performs communication in a listen before talk (LBT) manner by using the licensed spectrum resource.

With reference to the second aspect or any one of the foregoing possible implementations, in a thirteenth possible implementation, the first communications system is a cellular communications system, the second communications system is a wireless local area network communications system, the communications device is a base station or user equipment, and the second communications device is a wireless access point or a station; or both the first communications system and the second communications system are cellular communications systems, and both the communications device and the second communications device are base stations or user equipment.

Based on the foregoing technical solution, a device in a first communications system performs communication in a first sub-timeslot in a unit timeslot by using a spectrum resource at a priority higher than that of a device in a second communications system, and performs communication in a second sub-timeslot in the unit timeslot by using the spectrum resource at a priority lower than that of the device in the second communications system. A spectrum resource may be used by two communications systems in different timeslots at different priorities, avoiding that a fixed spectrum resource is reserved for a second communications system. Therefore, utilization of the spectrum resource is improved.

DESCRIPTION OF EMBODIMENTS

Figure 1:
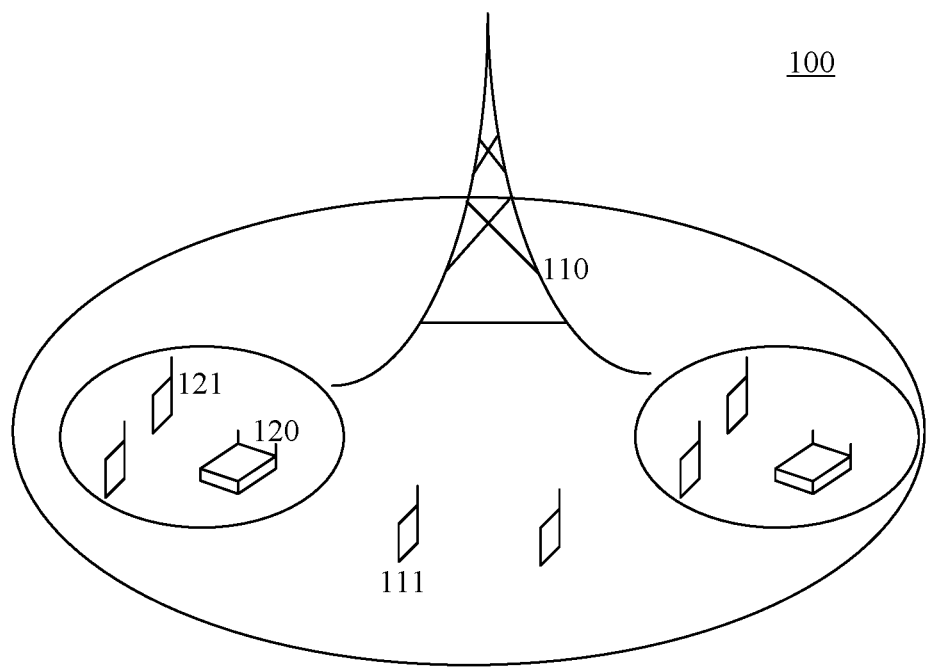
FIG. 1 is a schematic architectural diagram of a communications system according to an embodiment of the present invention.

The following clearly describes technical solutions in embodiments of the present invention with reference to the accompanying drawings. The described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a GSM (Global System for Mobile communications) system, a CDMA (Code Division Multiple Access) system, a WCDMA (Wideband Code Division Multiple Access) system, a GPRS (General Packet Radio Service), an LTE (Long Term Evolution) system, an LTE-A (Long Term Evolution Advanced) system, and a UMTS (Universal Mobile Telecommunications System), which is not limited in embodiments of the present invention. However, for ease of description, the embodiments of this application are described by using an LTE network as an example.

The embodiments of the present invention may be used in radio networks with different standards. A radio access network may include different network elements in different systems. For example, network elements on the radio access network in the LTE and LTE-A include an eNB (eNodeB, evolved NodeB), and network elements on the radio access network in the WCDMA include an RNC (radio network controller) and a NodeB. Similarly, other radio networks such as the WiMAX (Worldwide Interoperability for Microwave Access) may also use solutions similar to those in the embodiments of the present invention, and the only difference is that the related modules in a base station system may be different. No limitation is set by the embodiments of the present invention. However, for ease of description, the following embodiments are described by using an eNodeB as an example.

It should further be understood that in the embodiments of the present invention, user equipment (UE) includes but is not limited to a mobile station (MS), a mobile terminal, a mobile telephone, a handset, and portable equipment. The user equipment may communicate with one or more core networks by using a radio access network (RAN). For example, the user equipment may be a mobile telephone (or referred to as a "cellular" telephone), or a computer having a wireless communication function; the user equipment may also be a portable, pocket-sized, handheld, computer built-in, or in-vehicle mobile apparatus.

The following provides descriptions by using an example in which there are multiple Wi-Fi systems within coverage of a base station of a 3GPP system, and the 3GPP system and the Wi-Fi systems are deployed on a same target unlicensed band. The embodiments of the present invention are not limited thereto. The embodiments of the present invention may also be applicable to a scenario in which other communications systems are deployed on a same target unlicensed band.

FIG. 1 is a schematic architectural diagram of a communications system 100 according to an embodiment of the present invention.

The communications system 100 includes at least one 3GPP base station (BS) 110 and at least one Wi-Fi access point (AP) 120, and user equipment 111 in coverage of the 3GPP base station and a station (STA) 121 in coverage of the Wi-Fi access point. The 3GPP base station 110 and the Wi-Fi access point 120 are deployed on a same unlicensed spectrum resource. The 3GPP base station 110 may communicate with the user equipment 111 in the coverage of the 3GPP base station 110 by using the unlicensed spectrum resource, and the Wi-Fi access point 120 may communicate with the station 121 in coverage of the Wi-Fi access point 120 by using the unlicensed spectrum resource.

It should be understood that although the embodiment in FIG. 1 is described by using a 3GPP system and a Wi-Fi system as an example, this embodiment of the present invention is not limited thereto. For example, this embodiment of the present invention may also be applicable to another system (for example, a GSM system) that performs communication by using a licensed spectrum resource and another system (for example, Bluetooth) that performs communication by using an unlicensed spectrum resource.

Figure 2:
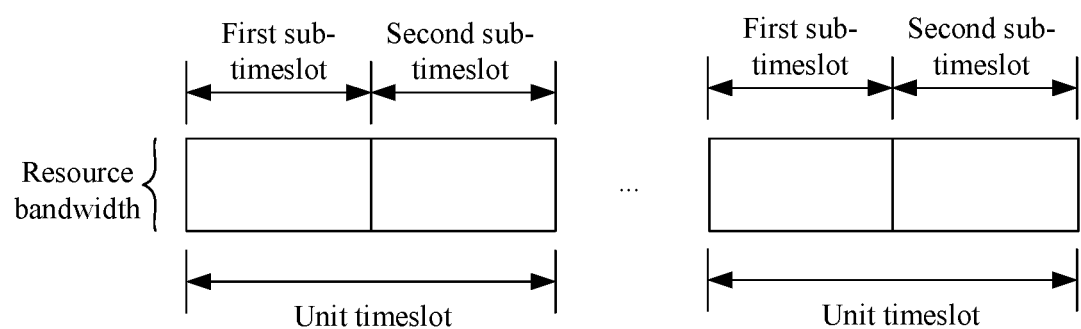
FIG. 2 is a schematic diagram of division of unit timeslots according to an embodiment of the present invention.

FIG. 2 is a schematic diagram of division of unit timeslots according to an embodiment of the present invention.

Referring to FIG. 2, in this embodiment of the present invention, an unlicensed spectrum resource may be divided into multiple unit timeslots in a time domain, and each unit timeslot is divided into a first sub-timeslot and a second sub-timeslot. In the first sub-timeslot, a priority at which a 3GPP base station 110 and user equipment 111 use resource bandwidth in the unlicensed spectrum resource to perform communication is higher than a priority at which an access point 120 and a station 121 of a Wi-Fi system use resource bandwidth in the unlicensed spectrum resource. In the second sub-timeslot, a priority at which the 3GPP base station 110 and the user equipment 111 use resource bandwidth in the unlicensed spectrum resource to perform communication is lower than a priority at which the access point 120 and the station 121 of the Wi-Fi system use resource bandwidth in the unlicensed spectrum resource to perform communication. That is, in the first sub-timeslot, the 3GPP base station 110 and the user equipment 111 may use in priority the resource bandwidth in the unlicensed spectrum resource to perform communication, and in the second sub-timeslot, the access point 120 and the station 121 of the Wi-Fi system may use in priority the resource bandwidth in the unlicensed spectrum resource to perform communication.

It should be understood that although the embodiment in FIG. 2 is described by using an example in which the first sub-timeslot is before the second sub-timeslot in the unit timeslot, this embodiment of the present invention is not limited thereto. For example, the first sub-timeslot may also be after the second sub-timeslot in the unit timeslot.

It should further be understood that although the embodiment in FIG. 2 is described by using an example in which the unit timeslot includes the first sub-timeslot and the second sub-timeslot, this embodiment of the present invention is not limited thereto. For example, the unit timeslot may include multiple first sub-timeslots and/or multiple second sub-timeslots.

Figure 3:
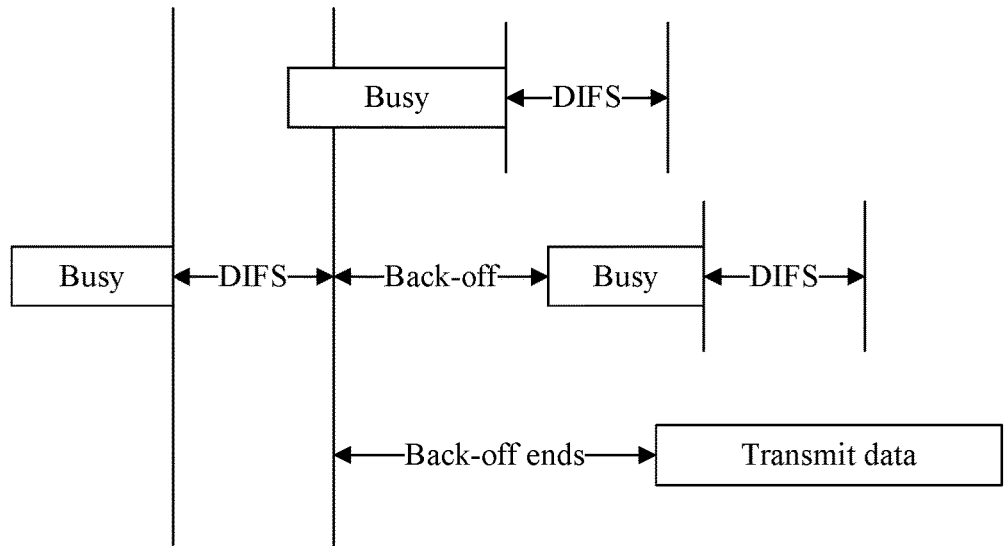
FIG. 3 is a schematic diagram of a CSMA/CA manner according to an embodiment of the present invention.

FIG. 3 is a schematic diagram of a CSMA/CA manner according to an embodiment of the present invention. The embodiment in FIG. 3 is described by using a Wi-Fi system as an example.

Referring to FIG. 3, a CSMA/CA technology is used to detect and avoid a collision caused when two or more network devices perform data transmission on a network. A working principle of the CSMA/CA technology is: A device (for example, a station or an access point) of the Wi-Fi system first performs carrier sensing (CS) to determine whether an unlicensed spectrum resource (a medium resource) is in a busy state; if the station or the access point determines that the unlicensed spectrum resource is idle or a busy state thereof ends, duration for which the station or the access point waits to preempt the unlicensed spectrum resource starts, that is, the station or the access point waits for a time period DIFS first, and then the station or the access point starts to wait for a random time period (a contention window or back-off time). The carrier sensing continues during the period, and if the unlicensed spectrum resource is still "idle" when the duration for which the station or the access point waits to preempt the unlicensed spectrum resource ends, the station starts to transmit data. If the station or the access point learns, by sensing, that the unlicensed spectrum resource is in a busy state again when the duration for which the station or the access point waits to preempt the unlicensed spectrum resource ends, the duration for which the station or the access point waits to preempt the unlicensed spectrum resource restarts. In addition, the transmission has constraints on a data size and duration. When the constraints are triggered, even if a service still exists, the station needs to contend for a resource again.

Specifically, the station first senses whether the unlicensed spectrum resource (for example, bandwidth or a channel to be occupied) is used by another station, that is, whether the unlicensed spectrum resource is idle. If the unlicensed spectrum resource is idle, the station waits for distributed inter-frame spacing (DIFS) duration; and if the unlicensed spectrum resource is busy, the station continues to sense. If another station occupies the unlicensed spectrum resource in a process in which the station waits for the DIFS duration, the station waits for the DIFS duration again and continues to sense. If the DIFS duration expires, countdown starts, that is, a contention window is entered. Duration of the contention window is also known as back-off time. In a countdown process, if the unlicensed spectrum resource is idle, that is, the another station does not transmit data, the station transmits data after the countdown is completed. If another station occupies the unlicensed spectrum resource during the countdown, the station continues sensing, waits for the another station to transmit data, and records a countdown time, and then continues to wait for DIFS duration after the another station completes transmitting the data. After the DIFS duration, the countdown continues from the recorded countdown time, and data is transmitted after the countdown ends. The foregoing back-off time may be determined randomly. A contention window (CW) may be expressed as ($CW_{min}$, $CW_{max}$). For example, in a wireless local area network (WLAN), CW may be set to be $2^n-1$, where n is a positive integer, so as to facilitate being implemented in a binary device. For example, $CW_{min}=2^4-1=15$, and $CW_{max}=2^5-1=31$ represents a window size may be randomly selected in a range of [15, 31].

It should be understood that according to the Wi-Fi system in this embodiment of the present invention, although a CSMA/CA mechanism is used as an example to describe a mechanism used by the Wi-Fi system to contend for an unlicensed spectrum resource, this embodiment of the present invention is not limited thereto. The Wi-Fi system in this embodiment of the present invention may also contend for an unlicensed spectrum resource or a licensed spectrum resource by using another mechanism such as listen before talk (LBT).

Figure 4:
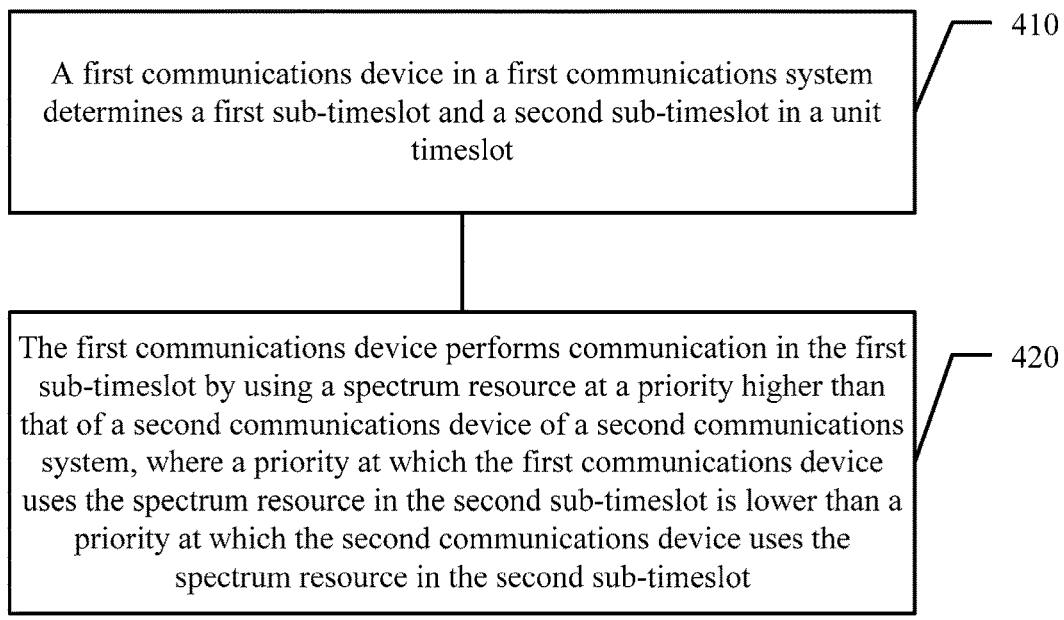
FIG. 4 is a schematic flowchart of a method for performing communication by using a spectrum resource according to an embodiment of the present invention.

FIG. 4 is a schematic flowchart of a method for performing communication by using a spectrum resource according to an embodiment of the present invention. For example, the method in FIG. 4 may be executed by the 3GPP station in the FIG. 1.

410: A first communications device in a first communications system determines a first sub-timeslot and a second sub-timeslot in a unit timeslot, where in the unit timeslot, the first communications device in the first communications system and a second communications device in a second communications system share a spectrum resource.

For example, the unit timeslot may be any one timeslot of multiple unit timeslots obtained by dividing the spectrum resource in a time domain. Both the first communications device in the first communications system and the second communications device in the second communications system may use the spectrum resource in the first sub-timeslot and the second sub-timeslot at different priorities. Duration of the first sub-timeslot may be equal to duration of the second sub-timeslot, and this embodiment of the present invention is not limited thereto. The duration of the first sub-timeslot may also be not equal to the duration of the second sub-timeslot. In the unit timeslot, the first sub-timeslot may be set before the second sub-timeslot, or the first sub-timeslot may be set after the second sub-timeslot.

For example, the first communications system may be a 3GPP system, and the second communications system may be a Wi-Fi system. This embodiment of the present invention is not limited thereto. For example, the first communications system may also be a GSM system or another system that uses a licensed spectrum resource to perform communication, and the second communications system may be a Bluetooth system or another system that uses a spectrum resource to perform communication. The first communications device may be a base station or user equipment in a 3GPP system, and the second communications device may be an access point or a station in a Wi-Fi system.

420: The first communications device performs communication in the first sub-timeslot by using the spectrum resource at a priority higher than that of the second communications device, where a priority at which the first communications device uses the spectrum resource in the second sub-timeslot is lower than a priority at which the second communications device uses the spectrum resource in the second sub-timeslot.

Specifically, in the first sub-timeslot, the priority at which the first communications device uses the spectrum resource to perform communication is higher than the priority at which the second communications device uses the spectrum resource to perform communication. In the second sub-timeslot, the priority at which the first communications device uses the spectrum resource to perform communication is lower than the priority at which the second communications device uses the spectrum resource to perform communication. That is, in the first sub-timeslot, the first communications device may use in priority the spectrum resource to perform communication, and in the second sub-timeslot, the second communications device may use in priority the spectrum resource to perform communication.

It should be understood that although this embodiment of the present invention is described by using two sub-timeslots in the unit timeslot as an example, this embodiment of the present invention is not limited thereto. The unit timeslot may include more sub-timeslots, and priorities at which a communications device in the first communications system and a communications device in the second communications system use a spectrum resource to perform communication in each sub-timeslot may be set according to needs, provided that in at least one sub-timeslot, a priority at which the first communications device uses a spectrum resource is higher than a priority at which the second communications device uses the spectrum resource, and in at least one sub-timeslot, a priority at which the first communications device uses a spectrum resource is lower than a priority at which the second communications device uses the spectrum resource.

It should further be understood that although this embodiment of the present invention is described by using the second communications device in the second communications system as an example, there may be multiple communications devices in the second communications system, and the multiple communications devices in the second communications system may contend for spectrum resources at a same priority in the second sub-timeslot.

It should further be understood that the spectrum resource may be one segment of bandwidth or multiple segments of bandwidth, or may be one or more channels, or even may be all bands.

According to this embodiment of the present invention, the spectrum resource may be an unlicensed spectrum resource, and this embodiment of the present invention is not limited thereto. For example, the spectrum resource may also be a licensed spectrum resource.

According to this embodiment of the present invention, a device in the first communications system in this embodiment of the present invention performs communication in a first sub-timeslot in a unit timeslot by using a spectrum resource at a priority higher than that of a device in a second communications system, and performs communication in a second sub-timeslot in the unit timeslot by using the spectrum resource at a priority lower than that of the device in the second communications system. A spectrum resource may be used by two communications systems in different timeslots at different priorities, avoiding that a fixed spectrum resource is reserved for a second communications system. Therefore, utilization of the spectrum resource is improved.

According to this embodiment of the present invention, in process 420, the first communications device performs communication in the first sub-timeslot by continuously using the spectrum resource, so that the second communications device performs communication in the first sub-timeslot by using the spectrum resource when the first communications device does not use the spectrum resource.

That is, the spectrum resource in the first sub-timeslot is occupied by the first communications device, and the second communications device can use the spectrum resource only when the first communications device does not use the spectrum resource in the first sub-timeslot. In this way, when it is ensured that the first communications device uses the spectrum resource, the spectrum resource can be effectively utilized by the second communications device when the first communications device does not use the spectrum resource. This improves utilization of the spectrum resource.

Optionally, in another embodiment, in process 420, the method in FIG. 4 further includes: performing, by the first communications device, communication in the second sub-timeslot by using the spectrum resource when the second communications device does not use the spectrum resource.

That is, the spectrum resource in the second sub-timeslot is occupied by the second communications device, and the first communications device can use the spectrum resource only when the second communications device does not use the spectrum resource in the second sub-timeslot. In this way, not only it is satisfied that the second communications device uses the spectrum resource, but also the spectrum resource can be taken back by the first communications device when the second communications device does not use the spectrum resource. This improves utilization of the spectrum resource.

According to this embodiment of the present invention, in process 420, duration for which the spectrum resource is idle when the first communications device performs communication in the first sub-timeslot by using the spectrum resource is less than duration for which the second communications device waits to preempt the spectrum resource.

For example, when the second communications device uses a CSMA/CA manner, the duration for which the second communications device waits to preempt the spectrum resource is equal to a sum of DIFS duration and back-off time. Because the first communications device continuously occupies the spectrum resource when performing communication, and duration for which the resource is idle is less than the duration for which the second communications device waits to preempt the spectrum resource, the second communications device is always in a waiting state during communication of the first communications device. For example, in a 3GPP system, when a base station performs communication by using a licensed spectrum resource, duration for which the resource is idle is usually less than duration for which a Wi-Fi system waits to preempt the spectrum resource when performing communication in a CSMA/CA manner. Therefore, in the first sub-timeslot, the first communications device may perform communication by using the spectrum resource in a manner the same as that used when the first communications device performs communication by using a licensed spectrum resource. This ensures that a priority at which the first communications device uses the spectrum resource is higher than a priority at which the Wi-Fi system uses the spectrum resource. Certainly, the base station may also perform communication in the first sub-timeslot in a CSMA/CA manner, provided that it is satisfied that duration for which the base station waits to preempt the spectrum resource is less than duration for which the second communications device waits to preempt the spectrum resource.

Optionally, in another embodiment, in process 420, duration for which the spectrum resource is idle when the first communications device performs communication in the second sub-timeslot by using the spectrum resource is greater than duration for which the second communications device waits to preempt the spectrum resource.

According to this embodiment of the present invention, in process 420, the first communications device performs communication in the second sub-timeslot in a first listen before talk (LBT) manner by using the spectrum resource, and the second communications device performs communication in the second sub-timeslot in a second listen before talk manner by using the spectrum resource, where distributed inter-frame spacing duration in the first listen before talk manner is greater than distributed inter-frame spacing duration in the second listen before talk manner; or duration between a start moment at which the spectrum resource is idle in the first listen before talk manner and a start moment of a contention window in the first listen before talk manner is greater than duration between a start moment at which the spectrum resource is idle in the second listen before talk manner and the start moment of the contention window in the first listen before talk manner, where the duration for which the second communications device waits to preempt the spectrum resource includes a sum of the DIFS duration in the second listen before talk manner and duration of a contention window in the second listen before talk manner.

According to this embodiment of the present invention, the LBT manner may be a CSMA/CA manner. For example, duration between an end moment of a busy state of the spectrum resource in a CSMA/CA manner of the first communications device and a start moment of a contention window in the CSMA/CA manner of the first communications device is greater than duration between an end moment of a busy state of the spectrum resource in a CSMA/CA manner of the second communications device and a start moment of a contention window in the CSMA/CA manner of the second communications device.

According to this embodiment of the present invention, in process 420, the first communications device performs communication in the second sub-timeslot in a first listen before talk manner by using the spectrum resource, and the second communications device performs communication in the second sub-timeslot in a second listen before talk manner by using the spectrum resource, where a minimum value of duration of a contention window in the first listen before talk manner is greater than a minimum value of duration of a contention window in the second listen before talk manner; and/or a maximum value of duration of a contention window in the first listen before talk manner is greater than a maximum value of duration of a contention window in the second listen before talk manner, where the duration for which the second communications device waits to preempt the spectrum resource includes a sum of DIFS duration in the second listen before talk manner and the duration of the contention window in the second listen before talk manner.

Optionally, in another embodiment, before the performing, by the first communications device, communication in the first sub-timeslot by using a spectrum resource at a priority higher than that of a second communications device in a second communications system, the method in FIG. 4 further includes: obtaining, by the first communications device, current load information of the second communications device, and determining, by the first communications device, the DIFS duration in the first listen before talk manner and the duration of the contention window in the first listen before talk manner according to the current load information of the second communications device.

According to this embodiment of the present invention, the first communications device can adjust and control two parameters related to a capability of taking back an idle resource: DIFS and CW, mainly to reduce a contention overhead in a time domain when the first communications device uses the spectrum resource. Because the priority at which the first communications device uses the spectrum resource is designed to be lower than the priority at which the second communications device uses the spectrum resource, duration for which the first communications device waits to preempt the spectrum resource needs to be greater than duration for which the second communications device waits to preempt the spectrum resource, resulting in an additional contention overhead in the time domain. If (DIFS, CW) used by the first communications device is more approximate to (DIFS, CW) of the second communications device, that is, priorities of the first communications device and the second communications device are closer, a lower contention overhead is caused. Therefore, to reduce the contention overhead of the first communications device, the (DIFS, CW) used by the first communications device may be close to the (DIFS, CW) of the second communications device as much as possible in a case of satisfying a load requirement of the second communications device.

Optionally, in another embodiment, before the performing, by the first communications device, communication in the first sub-timeslot by using the spectrum resource at a priority higher than that of the second communications device, the method in FIG. 4 further includes: broadcasting, by the first communications device, network allocation vector information at a start moment of the first sub-timeslot, where the network allocation vector information is used to indicate that the spectrum resource is in a busy state, and the network allocation vector information includes the duration of the first sub-timeslot, so that the second communications device does not use the spectrum resource in the duration of the first sub-timeslot, and where the performing, by the first communications device, communication in the first sub-timeslot by using the spectrum resource at a priority higher than that of the second communications device includes: performing, by the first communications device, communication in the first sub-timeslot by using the spectrum resource.

For example, whether the spectrum resource is occupied, that is, whether the spectrum resource is in a busy state or an idle state, is notified among devices of multiple second communications systems in a manner of broadcasting network allocation vector information. A device that receives the network allocation vector information does not use, in the first sub-timeslot indicated by the network allocation vector information, bandwidth of the spectrum resource on bandwidth of a spectrum resource to be occupied. The first communications device may send the network allocation vector information at the start moment of the first sub-timeslot by simulating a device in the second communications system, so that the second communications device learns that the spectrum resource is occupied, so as to wait, in the first sub-timeslot, for the resource to be idle. This can ensure that the priority at which the first communications device uses the spectrum resource in the first sub-timeslot is higher than the priority at which the second communications device uses the spectrum resource in the first sub-timeslot.

Optionally, in another embodiment, before the determining, by a first communications device in a first communications system, a first sub-timeslot and a second sub-timeslot in a unit timeslot, the method in FIG. 4 further includes: determining, by the first communications device, duration of the unit timeslot; and dividing, by the first communications device, the spectrum resource into multiple unit timeslots in a time domain according to the determined duration of the unit timeslot, where the unit timeslot is one of the multiple unit timeslots; and determining, by the first communications device, a percentage of the first sub-timeslot and the second sub-timeslot in the unit timeslot; and dividing, by the first communications device, each unit timeslot of the multiple timeslots into the first sub-timeslot and the second sub-timeslot according to the determined percentages of the first sub-timeslot and the second sub-timeslot in the unit timeslot.

For example, the percentages of the first sub-timeslot and the second sub-timeslot may be preset, or may be determined in real time according to load information of the first communications device and/or the second communications device.

Optionally, in another embodiment, before the determining, by the first communications device, percentages of the first sub-timeslot and the second sub-timeslot in the unit timeslot, the method in FIG. 4 further includes: obtaining, by the first communications device, current load information of the second communications device, where the determining, by the first communications device, percentages of the first sub-timeslot and the second sub-timeslot in the unit timeslot includes determining, by the first communications device, the percentages of the first sub-timeslot and the second sub-timeslot in the unit timeslot according to the current load information of the second communications device.

Specifically, the first communications device senses a working status of the second communications device in the second sub-timeslot to obtain current traffic load information of the second communications device, for example, obtain information such as traffic of a service of the second communications device and information such as traffic of a service of the first communications device. The first communications device determines the percentages of the first sub-timeslot and the second sub-timeslot in the unit timeslot according to the current traffic load information of the second communications device and current traffic load information of the first communications device, and divides the unit timeslot into the first sub-timeslot and the second sub-timeslot according to the determined percentages of the first sub-timeslot and the second sub-timeslot in the unit timeslot. For example, if the current traffic load of the second communications device is relatively high, a percentage of the second sub-timeslot in the unit timeslot may be relatively large. If the current traffic load of the second communications device is relatively low, the percentage of the second sub-timeslot in the unit timeslot may be relatively small. A load status of the second communications device is considered when the first communications performs division to obtain the first sub-timeslot and the second sub-timeslot. Therefore, an effect on the second communications device can be reduced.

Optionally, in another embodiment, the first communications device may also obtain network prior information by means of higher layer signaling, where the network prior information may be used to indicate a rule of a historical service of the second communications device. For example, the first communications device may obtain load information of the historical service of the second communications device according to the network prior information. The first communications device may also determine the percentages of the first sub-timeslot and the second sub-timeslot in the unit timeslot according to the current traffic load information of the second communications device, the current traffic load information of the first communications device, and network prior information of the first communications device and/or the second communications device, and divides the unit timeslot into the first sub-timeslot and the second sub-timeslot according to the determined percentages of the first sub-timeslot and the second sub-timeslot in the unit timeslot. For details about a specific division process, refer to the embodiment in FIG. 5, and details are not described herein again.

According to this embodiment of the present invention, because duration percentages of the first sub-timeslot and the second sub-timeslot in the unit timeslot may be adjusted according to a load status of the first communications system and/or the second communications device, utilization of spectrums can be further improved.

Optionally, in another embodiment, before the determining, by the first communications device, duration of the unit timeslot, the method in FIG. 4 further includes: obtaining, by the first communications device, a real-time requirement of the second communications device, where the determining, by the first communications device, duration of the unit timeslot includes: determining, by the first communications device, the duration of the unit timeslot according to the real-time requirement of the second communications device.

Specifically, if the second communications device has a relatively high service real-time requirement, a relatively short unit timeslot may be used. If the second communications device has a relatively low service real-time requirement, a relatively long unit timeslot may be used.

According to this embodiment of the present invention, the unit timeslot may be adjusted according to a service real-time requirement of the second communications device, so that duration of the unit timeslot can be adapted to a change in the real-time requirement of the service. Therefore, the real-time requirement of the service of the second communications device can be satisfied while improving resource utilization, and an effect on the second communications device can be reduced.

According to this embodiment of the present invention, the spectrum resource is an unlicensed spectrum resource shared by the first communications system and at least one second communications system, where a second communications device in the at least one second communications system performs communication in a listen before talk (LBT) manner by using the unlicensed spectrum resource.

For example, the LBT manner may be a Carrier Sensing Multiple Access/Collision Avoidance (CSMA/CA) manner.

Alternatively, in another embodiment, the spectrum resource is a licensed spectrum resource shared by the first communications system and at least one second communications system, where a second communications device in the at least one second communications system performs communication in a listen before talk (LBT) manner by using the licensed spectrum resource.

According to this embodiment of the present invention, the first communications system is a cellular communications system, the second communications system is a wireless local area network communications system, the first communications device is a base station or user equipment, and the second communications device is a wireless access point or a station.

For example, the first communications system is a 3GPP system, and the second communications system is a Wi-Fi system. When the first communications device is a station, the second communications device may be a wireless access point or a station. When the first communications device is user equipment, the second communications device may be a wireless access point or a station.

Alternatively, in another embodiment, both the first communications system and the second communications system are cellular communications systems, and both the first communications device and the second communications device are base stations or user equipment.

For example, both the first communications system and the second communications system may be 3GPP systems. When the first communications device is a base station, the second communications device may be a base station or user equipment. When the first communications device is user equipment, the second communications device may be a base station or user equipment.

Alternatively, in another embodiment, both the first communications system and the second communications system may be Wi-Fi systems. When the first communications device is a wireless access point, the second communications device may be a wireless access point or a station. When the first communications device is a station, the second communications device is a wireless access point or a station.

The following describes the embodiments of the present invention in more detail with reference to specific examples.

Figure 5:
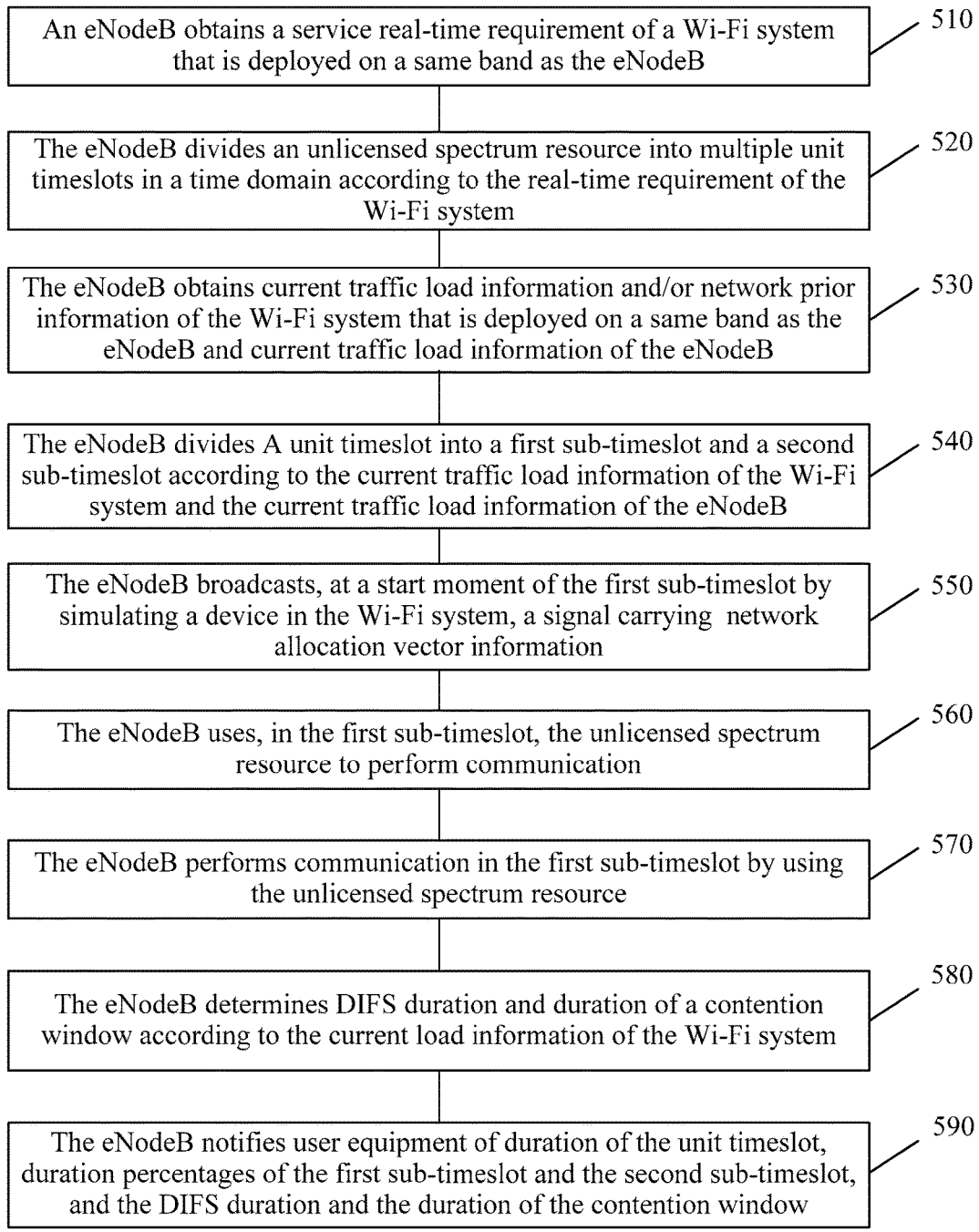
FIG. 5 is a schematic flowchart of a process of performing communication by using an unlicensed spectrum resource according to another embodiment of the present invention.

FIG. 5 is a schematic flowchart of a process of performing communication by using an unlicensed spectrum resource according to another embodiment of the present invention. In FIG. 5, an eNodeB represents a control base station of a current serving cell of a user equipment, the present invention is not limited to a specific system represented by the term, but may be similarly applied to a base station in another form.

510: The eNodeB obtains a service real-time requirement of a Wi-Fi system that is deployed on a same band as the eNodeB.

Specifically, the eNodeB may collect statistics on characteristics of the service of the Wi-Fi system that is deployed on a same band as the eNodeB, to determine the real-time requirement of the service of the Wi-Fi system. For example, the base station may collect statistics on transmission periods of service packets or time intervals for packet transmission. For example, the base station may collect statistics on a quantity of packets transmitted by a Wi-Fi system in a period of time, and obtain a transmission period or a time interval for packet transmission accordingly. If a transmission period is relatively short or a time interval of packets is relatively short, it indicates that the Wi-Fi system has a relatively high service real-time requirement, otherwise, it indicates that the Wi-Fi system has a relatively low service real-time requirement.

520: The eNodeB divides an unlicensed spectrum resource into multiple unit timeslots in a time domain according to the real-time requirement of the Wi-Fi system.

Specifically, the eNodeB determines duration of the unit timeslot according to the real-time requirement of the Wi-Fi system, and divides the unlicensed spectrum resource into multiple unit timeslots in the time domain according to the determined duration of the unit timeslot. For example, if the Wi-Fi system has a relatively high service real-time requirement, a relatively short unit timeslot may be used. If the Wi-Fi system has a relatively low service real-time requirement, a relatively long unit timeslot may be used.

Alternatively, these unit timeslots may also be configured by a 3GPP system. For example, the eNodeB may obtain the duration of the unit timeslot configured by the 3GPP system by means of higher layer signaling.

It should be understood that these unit timeslots may be designed to be unit timeslots with equal duration, for example, may be designed to be unit timeslots with duration of 1 ms. This has an advantage of simple design and control. In addition, due to simple control, a signaling overhead is relatively low. This embodiment of the present invention is not limited thereto. For example, these unit timeslots may also be designed to be unit timeslots with unequal duration. This has an advantage that duration of the unit timeslot may be adjusted according to the service real-time requirement, so that the duration of the unit timeslot can be adapted to a change in the service real-time requirement.

530: The eNodeB obtains current traffic load information and/or network prior information of the Wi-Fi system that is deployed on a same band as the eNodeB and current traffic load information of the eNodeB.

For example, in a second sub-timeslot, the eNodeB senses a working status of the Wi-Fi system that is deployed on a same band as the eNodeB, to obtain the current traffic load information of the Wi-Fi system, for example, to obtain information such as traffic of a service of the Wi-Fi system, and information such as traffic of a service of the eNodeB.

Optionally, the eNodeB may also obtain network prior information by means of higher layer signaling, where the network prior information may be used to indicate a rule of a historical service of the Wi-Fi system. For example, the eNodeB may obtain load information of the historical service of the Wi-Fi system according to the network prior information.

540: The eNodeB divides a unit timeslot into a first sub-timeslot and a second sub-timeslot according to the current traffic load information of the Wi-Fi system and the current traffic load information of the eNodeB.

Specifically, the eNodeB determines percentages of the first sub-timeslot and the second sub-timeslot in the unit timeslot according to the current traffic load information of the Wi-Fi system and the current traffic load information of the eNodeB, and divides the unit timeslot into the first sub-timeslot and the second sub-timeslot according to the determined percentages of the first sub-timeslot and the second sub-timeslot in the unit timeslot. For example, if current traffic load of the Wi-Fi system is relatively high, for example, the load is greater than a preset threshold, the percentage of the second sub-timeslot in the unit timeslot may be relatively large, and if current traffic load of the Wi-Fi system is relatively low, for example, the load is less than a preset threshold, the percentage of the second sub-timeslot in the unit timeslot may be relatively small.

Optionally, the eNodeB may also determine the percentages of the first sub-timeslot and the second sub-timeslot in the unit timeslot according to the current traffic load information of the Wi-Fi system and the current traffic load information of the eNodeB, and network prior information of the eNodeB and/or the Wi-Fi system, and divides the unit timeslot into the first sub-timeslot and the second sub-timeslot according to the determined percentages of the first sub-timeslot and the second sub-timeslot in the unit timeslot. For example, the eNodeB may determine an initial value of traffic load according to the network prior information; determine initial values of the percentages of the first sub-timeslot and the second sub-timeslot in the unit timeslot according to the initial value; and perform division according to the initial values to obtain the first sub-timeslot and the second sub-timeslot. Then, in a next unit timeslot, the percentages of the first sub-timeslot and the second sub-timeslot in the unit timeslot may be adjusted according to the obtained current traffic load information of the eNodeB and/or the Wi-Fi system, so that the percentages of the first sub-timeslot and the second sub-timeslot in the unit timeslot can be adapted to a change in current traffic load of the eNodeB and Wi-Fi system more quickly.

It should be understood that this embodiment of the present invention does not impose limitation on an execution sequence of process 510, process 520, process 530, and process 540. For example, process 530 and process 540 may be performed before process 510 and process 520.

550: The eNodeB broadcasts, at a start moment of the first sub-timeslot by simulating a device in the Wi-Fi system, a signal carrying network allocation vector (NAV) information.

For example, the signal may be a Beacon/Request To Send (RTS) signal, the NAV includes duration of a first sub-timeslot in a current unit timeslot. The eNodeB may send a signal including a NAV on bandwidth of an unlicensed spectrum resource to be occupied, and therefore exclusively claims that the eNodeB occupies the bandwidth. The NAV is used to indicate how long a medium of a target unlicensed spectrum resource is to be occupied. For example, that a value of the NAV is not zero (for example, 1 µs) indicates that a medium is busy, and that a value of the NAV is zero indicates that the medium is idle. After receiving the signal including the NAV, a receive end starts an internal counter to start performing countdown. When the counter does not return to zero, the receive end considers that a channel is in a busy state.

560: The eNodeB performs communication in the first sub-timeslot by using the unlicensed spectrum resource.

For example, if the device in the Wi-Fi system receives the NAV, it is determined that the unlicensed spectrum resource is in a busy state in the first sub-timeslot. In this case, a resource cannot be obtained by means of contention in the first sub-timeslot unless the eNodeB stops working, that is, a priority at which the eNodeB uses the target unlicensed spectrum resource in the first sub-timeslot is higher than a priority at which the device in the Wi-Fi system uses the target unlicensed spectrum resource in the first sub-timeslot. In this way, the eNodeB can use in priority the target unlicensed spectrum resource in the first sub-timeslot to perform communication.

570: The eNodeB performs communication in the second sub-timeslot in a CSMA/CA manner by using the unlicensed spectrum resource.

Figure 6A:
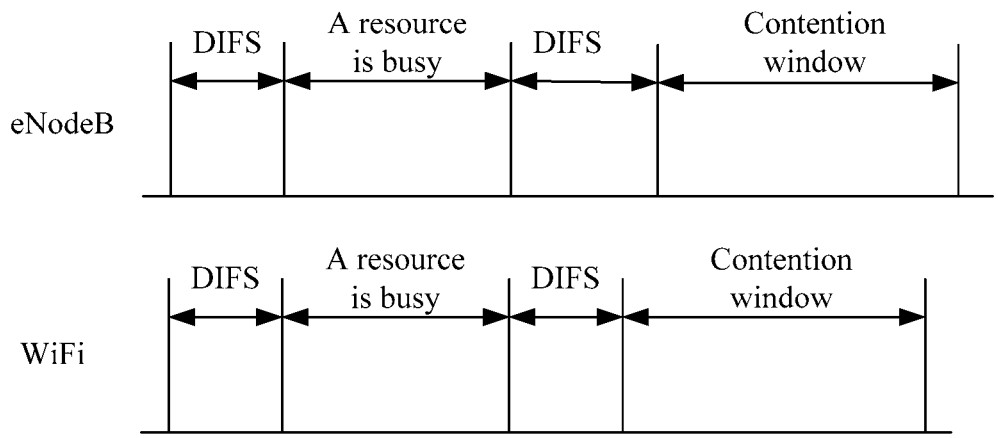
FIG. 6A is a schematic diagram of a CSMA/CA manner according to an embodiment of the present invention.

For example, both the eNodeB and the device in the Wi-Fi system perform communication in the second sub-timeslot in a CSMA/CA manner by using the unlicensed spectrum resource. DIFS duration in a CSMA/CA manner of the eNodeB is greater than DIFS duration in a CSMA/CA manner of the device in the Wi-Fi system. Referring to FIG. 6A, a DIFS when the eNodeB uses the CSMA/CA manner is greater than a DIFS when the device in the Wi-Fi system uses the CSMA/CA manner.

Figure 6B:
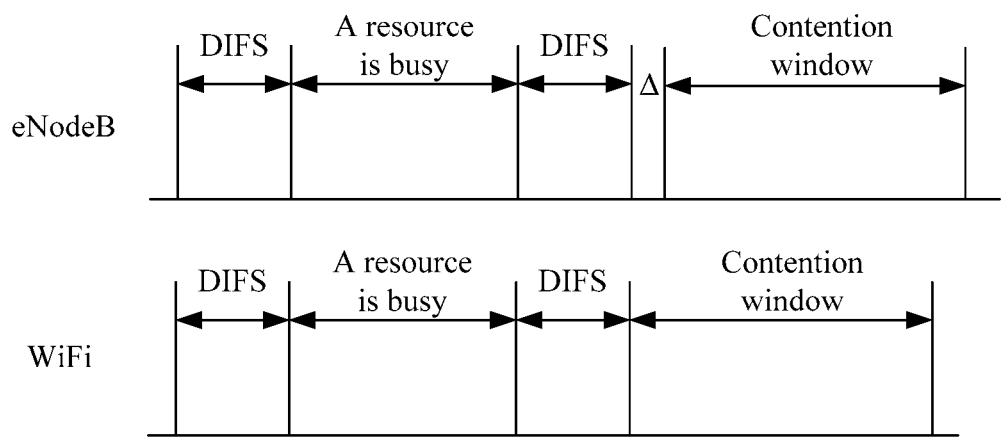
FIG. 6B is a schematic diagram of a CSMA/CA manner according to another embodiment of the present invention.

Duration between an end moment of a busy state of the unlicensed spectrum resource in a CSMA/CA manner of the eNodeB and a start moment of a contention window in the CSMA/CA manner of the eNodeB is greater than duration between an end moment of a busy state of the unlicensed spectrum resource in a CSMA/CA manner of the device in the Wi-Fi system and a start moment of a contention window in the CSMA/CA manner of the device in the Wi-Fi system. Alternatively, duration between a start moment of a busy state of the unlicensed spectrum resource in a CSMA/CA manner of the eNodeB and a start moment of a contention window in the CSMA/CA manner of the eNodeB is greater than duration between a start moment of a busy state of the unlicensed spectrum resource in a CSMA/CA manner of the device in the Wi-Fi system and a start moment of a contention window in the CSMA/CA manner of the device in the Wi-Fi system. Referring to FIG. 6B, duration between an end moment of a busy state of the resource and a start moment of a contention window when the eNodeB uses a CSMA/CA manner is DIFS+Δ, and duration between an end moment of a busy state of the resource and a start moment of a contention window when the Wi-Fi system uses a CSMA/CA manner is DIFS.

580: The eNodeB determines DIFS duration and duration of a contention window according to the current load information of the Wi-Fi system. In order to reduce an additional contention overhead caused when the eNodeB uses a CSMA/CA manner, DIFS duration and duration of the contention window that are of the eNodeB need to be close to DIFS duration and duration of the contention window of the Wi-Fi system as much as possible. In order to meet a load requirement of the Wi-Fi system, DIFS duration and duration of a contention window of the Wi-Fi system further need to be increased. Therefore, the two need to be balanced according to the load requirement of the Wi-Fi system, to determine appropriate DIFS duration and appropriate duration of the contention window.

590: The eNodeB notifies user equipment of duration of the unit timeslot, duration percentages of the first sub-timeslot and the second sub-timeslot, and the DIFS duration and the duration of the contention window. For example, the eNodeB sends, to user equipment that is managed or served by the eNodeB, the determined duration of the unit timeslot and the determined duration percentages of the first sub-timeslot and the second sub-timeslot in the unit timeslot by using a system message, so that the user equipment performs, according to the duration of the unit timeslot and the duration percentages of the first sub-timeslot and the second sub-timeslot, communication in the unit timeslot by using a target unlicensed spectrum resource.

Figure 7:
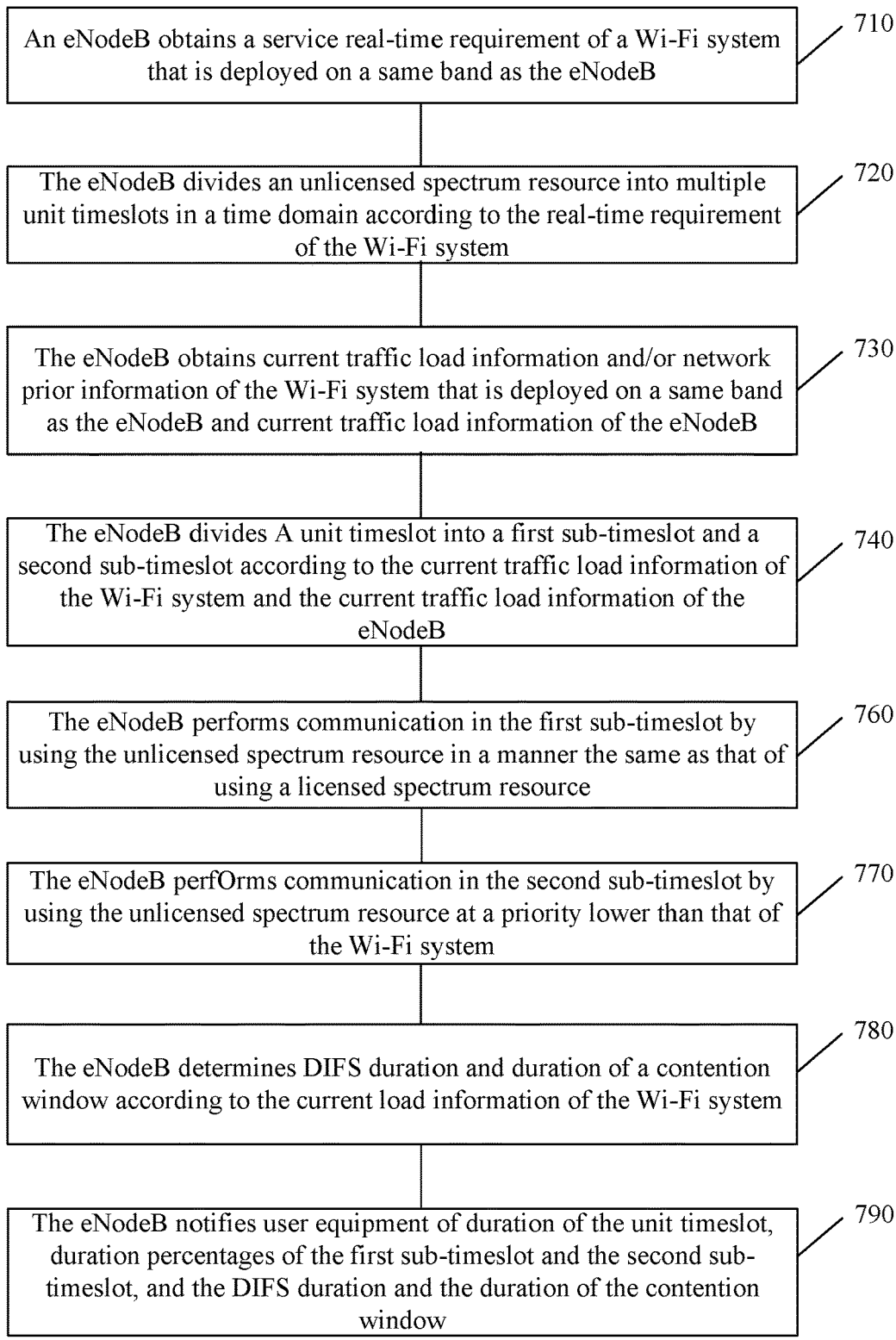
FIG. 7 is a schematic flowchart of a process of performing communication by using an unlicensed spectrum resource according to another embodiment of the present invention.

It should be understood that this embodiment of the present invention does not impose limitation on an execution sequence of process 550, process 560, and process 570. For example, process 570 may be performed before process 550 and process 560. FIG. 7 is a schematic flowchart of a process of performing communication by using an unlicensed spectrum resource according to another embodiment of the present invention. In FIG. 7, an eNodeB represents a control base station of a current serving cell of a user equipment, the present invention is not limited to a specific system represented by the term, but may be similarly applied to a base station in another form. Process 710 to process 740 of FIG. 7 are similar to process 510 to process 540 of FIG. 5, and detailed descriptions thereof are appropriately omitted herein.

710: The eNodeB obtains a service real-time requirement of a Wi-Fi system that is deployed on a same band as the eNodeB.

720: The eNodeB divides an unlicensed spectrum resource into multiple unit timeslots in a time domain according to the real-time requirement of the Wi-Fi system.

730: The eNodeB obtains current traffic load information and/or network prior information of the Wi-Fi system that is deployed on a same band as the eNodeB and current traffic load information of the eNodeB.

740: The eNodeB divides a unit timeslot into a first sub-timeslot and a second sub-timeslot according to the current traffic load information of the Wi-Fi system and the current traffic load information of the eNodeB. It should be understood that this embodiment of the present invention does not impose limitation on an execution sequence of process 710 and process 720, and process 730 and process 740, for example, process 730 and process 740 may be performed before to process 710 and process 720.

760: The eNodeB performs communication in the first sub-timeslot by using the unlicensed spectrum resource in a manner the same as that of using a licensed spectrum resource.

For example, in a 3GPP system, a synchronization frame-based continuous scheduling manner in which a base station performs centralized control is generally used. When the eNodeB performs communication in the first sub-timeslot by using the unlicensed spectrum resource in a continuous scheduling manner, because Wi-Fi uses the unlicensed spectrum resource based on a CSMA/CA manner, when interference occurs, the Wi-Fi actively waits, and evades a signal of the 3GPP system. Consequently, the 3GPP system occupies the spectrum resource in priority in the first sub-timeslot, whereas a Wi-Fi user is in an interference-evading and waiting state all the time.

770: The eNodeB performs communication in the second sub-timeslot by using the unlicensed spectrum resource at a priority lower than that of the Wi-Fi system. A first communications device performs communication in a second sub-timeslot in a first CSMA/CA manner by using an unlicensed spectrum resource, and a second communications device performs communication in the second sub-timeslot in a second CSMA/CA manner by using the unlicensed spectrum resource. A minimum value of duration of a contention window in the first CSMA/CA manner is greater than a minimum value of duration of a contention window in the second CSMA/CA manner, and/or a maximum value of duration of a contention window in the first CSMA/CA manner is greater than a maximum value of duration of a contention window in the second CSMA/CA manner.

780: The eNodeB determines DIFS duration and duration of a contention window according to the current load information of the Wi-Fi system.

790: The eNodeB notifies user equipment of duration of the unit timeslot, duration percentages of the first sub-timeslot and the second sub-timeslot, and the DIFS duration and the duration of the contention window.

It should be understood that this embodiment of the present invention does not impose limitation on an execution sequence of process 760 and process 770. For example, process 770 may be performed before process 760. According to this embodiment of the present invention, in the second sub-timeslot, when the WI-FI does not use a channel, the eNodeB can take back a resource in a timely manner to avoid a waste. Moreover, the eNodeB can analyze service characteristics (for example, traffic flow, channel use frequency, duration for which a channel is used each time) of the WI-FI system according to network prior information, and/or traffic load information obtained by monitoring or sensing, so as to predict a resource usage of the WI-FI system. The eNodeB may adjust the unit timeslot and the percentages of the first sub-timeslot and the second sub-timeslot according to the prediction result. Therefore, an effect on the second communications system can be reduced as much as possible. In addition, according to this embodiment of the present invention, two parameters related to a capability of taking back an idle resource can also be adjusted and controlled: DIFS and CW. This is mainly to reduce a contention overhead of the eNodeB in a time domain. If (DIFS, CW) used by the eNodeB is more approximate to (DIFS, CW) of the device in the WI-FI system, that is, priorities of the eNodeB and the device in the WI-FI system are closer, a lower contention overhead is caused.

The foregoing describes the method for performing communication by using an unlicensed spectrum resource according to the embodiments of the present invention. The following describes, with reference to FIG. 8 and FIG. 9 separately, a communications device according to an embodiment of the present invention.

Figure 8:
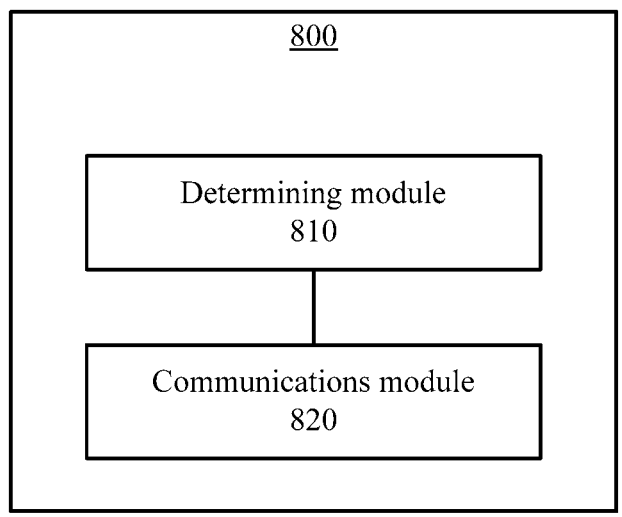
FIG. 8 is a schematic structural diagram of a communications device according to another embodiment of the present invention.

FIG. 8 is a schematic structural diagram of a communications device 800 according to another embodiment of the present invention. The communications device 800 includes a determining module 810 and a communications module 820. The embodiment in FIG. 8 corresponds to the embodiment in FIG. 4, and detailed descriptions thereof are appropriately omitted herein. The communications device 800 is the first communications device 400 in FIG. 4.

The determining module 810 is configured to determine a first sub-timeslot and a second sub-timeslot in a unit timeslot. The communications module 820 is configured to perform communication in the first sub-timeslot by using a spectrum resource at a priority higher than that of a second communications device in a second communications system, where the communications device 800 is a communications device in the first communications system, and a priority at which the communications device 800 uses the spectrum resource in the second sub-timeslot is lower than a priority at which the second communications device uses the spectrum resource in the second sub-timeslot. According to this embodiment of the present invention, a device in the first communications system in this embodiment of the present invention performs communication in a first sub-timeslot in a unit timeslot by using a spectrum resource at a priority higher than that of a device in a second communications system, and performs communication in a second sub-timeslot in the unit timeslot by using the spectrum resource at a priority lower than that of the device in the second communications system. A spectrum resource may be used by two communications systems in different timeslots at different priorities, avoiding that a fixed spectrum resource is reserved for a second communications system. Therefore, utilization of the spectrum resource is improved.

According to this embodiment of the present invention, the communications module 820 performs communication in the first sub-timeslot by continuously using the spectrum resource, so that the second communications device performs communication in the first sub-timeslot by using the spectrum resource when the communications device 800 does not use the spectrum resource.

Optionally, in another embodiment, the communications module 820 further performs communication in the second sub-timeslot by using the spectrum resource when the second communications device does not use the spectrum resource.

Optionally, in another embodiment, duration for which the spectrum resource is idle when the communications module 820 performs communication in the first sub-timeslot by using the spectrum resource is less than duration for which the second communications device waits to preempt the spectrum resource.

According to this embodiment of the present invention, duration for which the spectrum resource is idle when the communications module 820 performs communication in the second sub-timeslot by using the spectrum resource is greater than duration for which the second communications device waits to preempt the spectrum resource.

According to this embodiment of the present invention, the communications module 820 performs communication in the second sub-timeslot in a first listen before talk LBT manner by using the spectrum resource, and the second communications device performs communication in the second sub-timeslot in a second listen before talk manner by using the spectrum resource, where distributed inter-frame spacing duration in the first listen before talk manner is greater than distributed inter-frame spacing duration in the second listen before talk manner; or duration between a start moment at which the spectrum resource is idle in the first listen before talk manner and a start moment of a contention window in the first listen before talk manner is greater than duration between a start moment at which the spectrum resource is idle in the second listen before talk manner and the start moment of the contention window in the first listen before talk manner, where the duration for which the second communications device waits to preempt the spectrum resource includes a sum of the DIFS duration in the second listen before talk manner and duration of a contention window in the second listen before talk manner.

According to this embodiment of the present invention, the communications module 820 performs communication in the second sub-timeslot in a first listen before talk manner by using the spectrum resource, and the second communications device performs communication in the second sub-timeslot in a second listen before talk manner by using the spectrum resource, where a minimum value of duration of a contention window in the first listen before talk manner is greater than a minimum value of duration of a contention window in the second listen before talk manner; and/or a maximum value of duration of a contention window in the first listen before talk manner is greater than a maximum value of duration of a contention window in the second listen before talk manner, where the duration for which the second communications device waits to preempt the spectrum resource includes a sum of DIFS duration in the second listen before talk manner and the duration of the contention window in the second listen before talk manner.

Optionally, in another embodiment, the communications module 820 is further configured to obtain current load information of the second communications device before performing communication in the first sub-timeslot by using the spectrum resource at the priority higher than that of the second communications device in the second communications system, where the determining module 810 is further configured to determine the DIFS duration in the first listen before talk manner and the duration of the contention window in the first listen before talk manner according to current load information of the first communications device and the current load information of the second communications device.

According to this embodiment of the present invention, before performing communication in the first sub-timeslot by using the spectrum resource at the priority higher than that of the second communications device, the communications module 820 further broadcasts network allocation vector information at a start moment of the first sub-timeslot, and performs communication in duration of the first sub-timeslot by using the spectrum resource, where the network allocation vector information is used to indicate that the spectrum resource is in a busy state, and the network allocation vector information includes the duration of the first sub-timeslot, so that the second communications device does not use the spectrum resource in the duration of the first sub-timeslot.

Optionally, in another embodiment, before determining the first sub-timeslot and the second sub-timeslot in the unit timeslot, the determining module 810 further determines duration of the unit timeslot; determines percentages of the first sub-timeslot and the second sub-timeslot in the unit timeslot, where the unit timeslot is one of the multiple unit timeslots; divides the spectrum resource into multiple unit timeslots in a time domain according to the determined duration of the unit timeslot, and divides each unit timeslot of the multiple timeslots into the first sub-timeslot and the second sub-timeslot according to the determined percentages of the first sub-timeslot and the second sub-timeslot in the unit timeslot.

Optionally, in another embodiment, the communications module 820 is further configured to: before the determining module 810 determines the duration of the unit timeslot, obtain current load information of the first communications device, and obtain current load information of the second communications device, where the determining module 810 determines the percentages of the first sub-timeslot and the second sub-timeslot in the unit timeslot according to the current load information of the first communications device and the current load information of the second communications device.

Alternatively, in another embodiment, the communications module 820 is further configured to obtain a real-time requirement of the second communications device, where the communications module 820 determines the duration of the unit timeslot according to the real-time requirement of the second communications device.

According to this embodiment of the present invention, the spectrum resource is an unlicensed spectrum resource shared by the first communications system and at least one second communications system, where a second communications device in the at least one second communications system performs communication in a listen before talk (LBT) manner by using the unlicensed spectrum resource.

Alternatively, in another embodiment, the spectrum resource is a licensed spectrum resource shared by the first communications system and at least one second communications system, where a second communications device in the at least one second communications system performs communication in a listen before talk (LBT) manner by using the licensed spectrum resource.

According to this embodiment of the present invention, the first communications system is a cellular communications system, the second communications system is a wireless local area network communications system, the first communications device is a base station or user equipment, and the second communications device is a wireless access point or a station.

Alternatively, in another embodiment, both the first communications system and the second communications system are cellular communications systems, and both the first communications device and the second communications device are base stations or user equipment.

Alternatively, in another embodiment, both the first communications system and the second communications system may be Wi-Fi systems. When the first communications device is a wireless access point, the second communications device may be a wireless access point or a station. When the first communications device is a station, the second communications device is a wireless access point or a station.

For operations and functions of units of the communications device 800, refer to the method in FIG. 4. To avoid repetition, details are not described herein.

Figure 9:
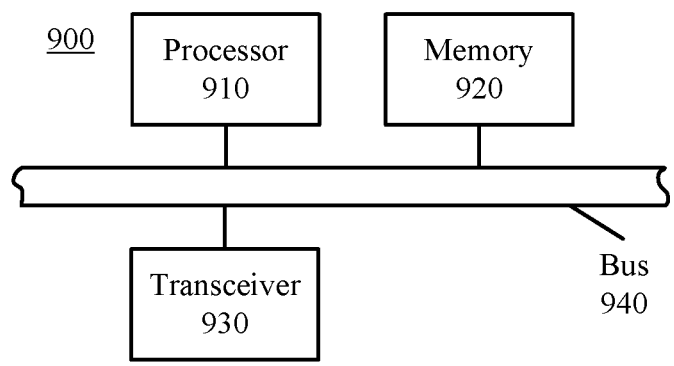
FIG. 9 is a schematic structural diagram of a communications device according to another embodiment of the present invention.

FIG. 9 is a schematic structural diagram of a communications device 900 according to another embodiment of the present invention. The communications device 900 includes a processor 910, a memory 920, a transceiver 930, and a communications bus 940. The embodiment in FIG. 9 corresponds to the embodiment in FIG. 4, and detailed descriptions thereof are appropriately omitted herein. The communications device 900 is the first communications device 400 in FIG. 4.

The processor 910 is configured to invoke, by using the communications bus 940, code stored in the memory 920, to determine a first sub-timeslot and a second sub-timeslot in a unit timeslot. The transceiver 930 performs communication in the first sub-timeslot by using a spectrum resource at a priority higher than that of a second communications device in a second communications system, where the communications device 900 is a communications device in the first communications system, and a priority at which the communications device 900 uses the spectrum resource in the second sub-timeslot is lower than a priority at which the second communications device uses the spectrum resource in the second sub-timeslot.

According to this embodiment of the present invention, a device in the first communications system in this embodiment of the present invention performs communication in a first sub-timeslot in a unit timeslot by using a spectrum resource at a priority higher than that of a device in a second communications system, and performs communication in a second sub-timeslot in the unit timeslot by using the spectrum resource at a priority lower than that of the device in the second communications system. A spectrum resource may be used by two communications systems in different timeslots at different priorities, avoiding that a fixed spectrum resource is reserved for a second communications system. Therefore, utilization of the spectrum resource is improved.

It should be understood that, alternatively, in another embodiment, the transceiver 930 may be implemented as a receiver and/or a transmitter.

According to this embodiment of the present invention, the transceiver 930 performs communication in the first sub-timeslot by continuously using the spectrum resource, so that the second communications device performs communication in the first sub-timeslot by using the spectrum resource when the communications device 900 does not use the spectrum resource.

Optionally, in another embodiment, the transceiver 930 further performs communication in the second sub-timeslot by using the spectrum resource when the second communications device does not use the spectrum resource.

Optionally, in another embodiment, duration for which the spectrum resource is idle when the transceiver 930 performs communication in the first sub-timeslot by using the spectrum resource is less than duration for which the second communications device waits to preempt the spectrum resource.

According to this embodiment of the present invention, duration for which the spectrum resource is idle when the communications device 900 performs communication in the second sub-timeslot by using the spectrum resource is greater than duration for which the second communications device waits to preempt the spectrum resource.

According to this embodiment of the present invention, the transceiver 930 performs communication in the second sub-timeslot in a first listen before talk (LBT) manner by using the spectrum resource, and the second communications device performs communication in the second sub-timeslot in a second listen before talk manner by using the spectrum resource, where distributed inter-frame spacing duration in the first listen before talk manner is greater than distributed inter-frame spacing duration in the second listen before talk manner; or duration between a start moment at which the spectrum resource is idle in the first listen before talk manner and a start moment of a contention window in the first listen before talk manner is greater than duration between a start moment at which the spectrum resource is idle in the second listen before talk manner and the start moment of the contention window in the first listen before talk manner, where the duration for which the second communications device waits to preempt the spectrum resource includes a sum of the DIFS duration in the second listen before talk manner and duration of a contention window in the second listen before talk manner.

According to this embodiment of the present invention, the transceiver 930 performs communication in the second sub-timeslot in a first listen before talk manner by using the spectrum resource, and the second communications device performs communication in the second sub-timeslot in a second listen before talk manner by using the spectrum resource, where a minimum value of duration of a contention window in the first listen before talk manner is greater than a minimum value of duration of a contention window in the second listen before talk manner; and/or a maximum value of duration of a contention window in the first listen before talk manner is greater than a maximum value of duration of a contention window in the second listen before talk manner, where the duration for which the second communications device waits to preempt the spectrum resource includes a sum of DIFS duration in the second listen before talk manner and the duration of the contention window in the second listen before talk manner.

Optionally, in another embodiment, the processor 910 is further configured to: before performing communication in the first sub-timeslot by using the spectrum resource at the priority higher than that of the second communications device in the second communications system, obtain current load information of the second communications device, and determine the DIFS duration in the first listen before talk manner and the duration of the contention window in the first listen before talk manner according to the current load information of the second communications device.

Before performing communication in the first sub-timeslot by using the spectrum resource at the priority higher than that of the second communications device, the transceiver 930 further broadcasts network allocation vector information at a start moment of the first sub-timeslot, and performs communication in duration of the first sub-timeslot by using the spectrum resource, where the network allocation vector information is used to indicate that the spectrum resource is in a busy state, and the network allocation vector information includes the duration of the first sub-timeslot, so that the second communications device does not use the spectrum resource in the duration of the first sub-timeslot.

Optionally, in another embodiment, before determining the first sub-timeslot and the second sub-timeslot in the unit timeslot, the processor 910 further determines duration of the unit timeslot; and determines percentages of the first sub-timeslot and the second sub-timeslot in the unit timeslot, where the unit timeslot is one of the multiple unit timeslots. The processor 910 divides the spectrum resource into multiple unit timeslots in a time domain according to the determined duration of the unit timeslot, and divides each unit timeslot of the multiple timeslots into the first sub-timeslot and the second sub-timeslot according to the determined percentages of the first sub-timeslot and the second sub-timeslot in the unit timeslot.

Optionally, in another embodiment, before determining the percentages of the first sub-timeslot and the second sub-timeslot in the unit timeslot, the transceiver 930 further obtains the current load information of the second communications device. The processor 910 determines the percentages of the first sub-timeslot and the second sub-timeslot in the unit timeslot according to the current load information of the second communications device.

Alternatively, in another embodiment, before the determining module determines the duration of the unit timeslot, the transceiver 930 further obtains a real-time requirement of the second communications device. The processor 910 determines the duration of the unit timeslot according to the real-time requirement of the second communications device.

Alternatively, in another embodiment, the spectrum resource is a licensed spectrum resource shared by the first communications system and at least one second communications system, where a second communications device in the at least one second communications system performs communication in a listen before talk (LBT) manner by using the licensed spectrum resource.

For example, the LBT manner may be a Carrier Sensing Multiple Access/Collision Avoidance (CSMA/CA) manner.

According to this embodiment of the present invention, the first communications system is a cellular communications system, the second communications system is a wireless local area network communications system, the first communications device is a base station or user equipment, and the second communications device is a wireless access point or a station.

For example, the first communications system is a 3GPP system, and the second communications system is a Wi-Fi system. When the first communications device is a station, the second communications device may be a wireless access point or a station. When the first communications device is user equipment, the second communications device may be a wireless access point or a station.

Alternatively, in another embodiment, both the first communications system and the second communications system are cellular communications systems, and both the first communications device and the second communications device are base stations or user equipment.

For example, both the first communications system and the second communications system may be 3GPP systems. When the first communications device is a base station, the second communications device may be a base station or user equipment. When the first communications device is user equipment, the second communications device may be a base station or user equipment.

Alternatively, in another embodiment, both the first communications system and the second communications system may be Wi-Fi systems. When the first communications device is a wireless access point, the second communications device may be a wireless access point or a station. When the first communications device is a station, the second communications device is a wireless access point or a station.

For operations and functions of units of the communications device 900, refer to the method of FIG. 4. To avoid repetition, details are not described herein.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A method for performing communication by using a spectrum resource, comprising:
   determining, by a first communications device in a first communications system, a first sub-timeslot and a second sub-timeslot in a unit timeslot; and
   performing, by the first communications device, communication in the first sub-timeslot by using the spectrum resource, wherein the first communications device has a priority higher than that of a second communications device in a second communications system in the first sub-timeslot, and, wherein the first communications device has a priority lower than that of the second communications device in the second sub-timeslot;
   wherein before determining the first sub-timeslot and the second sub-timeslot in the unit timeslot, the method further comprises:
      determining, by the first communications device, a duration of the unit timeslot; and
      dividing, by the first communications device, the spectrum resource into multiple unit timeslots in a time domain according to the determined duration of the unit timeslot, wherein the unit timeslot is one of the multiple unit timeslots; and
   wherein determining the first sub-timeslot and the second sub-timeslot in the unit timeslot comprises:
      determining, by the first communications device, percentages of the first sub-timeslot and the second sub-timeslot in the unit timeslot based on current traffic load information of the first communications device and/or current traffic load information of the second communications device; and
      dividing, by the first communications device, each unit timeslot of the multiple unit timeslots into the first sub-timeslot and the second sub-timeslot according to the determined percentages of the first sub-timeslot and the second sub-timeslot in the unit timeslot.

2. The method according to claim 1, wherein the first communications device performing communication in the first sub-timeslot by using the spectrum resource comprises:
   performing, by the first communications device, communication in the first sub-timeslot by continuously using the spectrum resource such that the second communication device is not able to perform communication in the first sub-timeslot using the spectrum resource.

3. The method according to claim 1, further comprising:
   performing, by the first communications device, communication in the second sub-timeslot by using the spectrum resource in the second sub-timeslot when the second communications device does not use the spectrum resource in the second sub-timeslot.

4. The method according to claim 1, wherein a duration for which the spectrum resource is idle when the first communications device performs communication in the first sub-timeslot by using the spectrum resource is less than a duration for which the second communications device waits to preempt the spectrum resource; and/or
   wherein a duration for which the spectrum resource is idle when the first communications device performs communication in the second sub-timeslot by using the spectrum resource is greater than the duration for which the second communications device waits to preempt the spectrum resource.

5. The method according to claim 4, wherein the first communications device performs communication in the second sub-timeslot in a first listen before talk (LBT) manner by using the spectrum resource, and the second communications device performs communication in the second sub-timeslot in a second LBT manner by using the spectrum resource;
   wherein:
      a distributed inter-frame spacing (DIFS) duration in the first LBT manner is greater than a DIFS duration in the second LBT manner; or
      a duration between a start moment at which the spectrum resource is idle in the first LBT manner and a start moment of a contention window in the first LBT manner is greater than a duration between a start moment at which the spectrum resource is idle in the second LBT manner and the start moment of the contention window in the first LBT manner; and
   wherein the duration for which the second communications device waits to preempt the spectrum resource comprises a sum of the DIFS duration in the second LBT manner and a duration of a contention window in the second LBT manner.

6. The method according to claim 4, wherein the first communications device performs communication in the second sub-timeslot in a first listen before talk (LBT) manner by using the spectrum resource, and the second communications device performs communication in the second sub-timeslot in a second LBT manner by using the spectrum resource;
wherein:
a minimum value of a duration of a contention window in the first LBT manner is greater than a minimum value of a duration of a contention window in the second LBT manner; or
a maximum value of the duration of the contention window in the first LBT manner is greater than a maximum value of the duration of the contention window in the second LBT manner; and
wherein the duration for which the second communications device waits to preempt the spectrum resource comprises a sum of a distributed inter-frame spacing (DIFS) duration in the second LBT manner and the duration of the contention window in the second LBT manner.

7. The method according to claim 1, wherein before performing communication in the first sub-timeslot by using the spectrum resource, the method further comprises:
broadcasting, by the first communications device, network allocation vector information at a start moment of the first sub-timeslot, wherein the network allocation vector information indicates that the spectrum resource is in a busy state, and the network allocation vector information comprises a duration of the first sub-timeslot, so that the second communications device does not use the spectrum resource in the duration of the first sub-timeslot.

8. The method according to claim 1, wherein the spectrum resource is an unlicensed spectrum resource or a licensed spectrum resource shared by the first communications system and the second communications system, wherein the second communications device in the second communications system performs communication in a listen before talk (LBT) manner by using the unlicensed spectrum resource or the licensed spectrum resource, respectively.

9. The method according to claim 1, wherein the first communications system is a cellular communications system, the second communications system is a wireless local area network communications system, the first communications device is a base station or a user equipment, and the second communications device is a wireless access point or a station; or
wherein both the first communications system and the second communications system are cellular communications systems, and both the first communications device and the second communications device are base stations or user equipment.

10. A communications device, comprising:
a processor, configured to determine a first sub-timeslot and a second sub-timeslot in a unit timeslot; and
a transceiver, configured to perform communication in the first sub-timeslot by using a spectrum resource, wherein the communications device has a priority higher than that of a second communications device in a second communications system in the first sub-timeslot, and wherein the communications device has a priority lower than that of the second communications device in the second sub-timeslot;
wherein:
a duration for which the spectrum resource is idle when the transceiver performs communication in the first sub-timeslot by using the spectrum resource is less than a duration for which the second communications device waits to preempt the spectrum resource; and/or
a duration for which the spectrum resource is idle when the transceiver performs communication in the second sub-timeslot by using the spectrum resource is greater than the duration for which the second communications device waits to preempt the spectrum resource;
wherein the transceiver is further configured to perform communication in the second sub-timeslot in a first listen before talk (LBT) manner by using the spectrum resource, and the second communications device is configured to perform communication in the second sub-timeslot in a second LBT manner by using the spectrum resource;
wherein:
a distributed inter-frame spacing (DIFS) duration in the first LBT manner is greater than a DIFS duration in the second LBT manner; or
a duration between a start moment at which the spectrum resource is idle in the first LBT manner and a start moment of a contention window in the first LBT manner is greater than a duration between a start moment at which the spectrum resource is idle in the second LBT manner and the start moment of the contention window in the first LBT manner; and
wherein the duration for which the second communications device waits to preempt the spectrum resource comprises a sum of the DIFS duration in the second LBT manner and a duration of a contention window in the second LBT manner.

11. The communications device according to claim 10, wherein the transceiver is configured to perform communication in the first sub-timeslot by continuously using the spectrum resource such that the second communication device is not able to perform communication in the first sub-timeslot using the spectrum resource.

12. The communications device according to claim 10, wherein the transceiver is further configured to perform communication in the second sub-timeslot by using the spectrum resource in the second sub-timeslot when the second communications device does not use the spectrum resource in the second sub-timeslot.

13. The communications device according to claim 10, wherein the transceiver is further configured to broadcast network allocation vector information at a start moment of the first sub-timeslot before performing communication in the first sub-timeslot by using the spectrum resource at the priority higher than that of the second communications device, wherein the network allocation vector information indicates that the spectrum resource is in a busy state, and the network allocation vector information comprises a duration of the first sub-timeslot, so that the second communications device does not use the spectrum resource in the duration of the first sub-timeslot.

14. The communications device according to claim 10, wherein the processor is further configured to, before determining the first sub-timeslot and the second sub-timeslot in the unit timeslot:
determine a duration of the unit timeslot;
determine percentages of the first sub-timeslot and the second sub-timeslot in the unit timeslot, wherein the unit timeslot is one of multiple unit timeslots;

divide the spectrum resource into the multiple unit timeslots in a time domain according to the determined duration of the unit timeslot; and divide each unit timeslot of the multiple unit timeslots into the first sub-timeslot and the second sub-timeslot according to the determined percentages of the first sub-timeslot and the second sub-timeslot in the unit timeslot.

15. The communications device according to claim 14, wherein the transceiver is further configured to obtain current load information of the second communications device before determining the percentages of the first sub-timeslot and the second sub-timeslot in the unit timeslot, and wherein the processor is further configured to determine the percentages of the first sub-timeslot and the second sub-timeslot in the unit timeslot according to the current load information of the second communications device.

16. The communications device according to claim 14, wherein the transceiver is further configured to obtain a real-time requirement of the second communications device before the processor determines the duration of the unit timeslot, and wherein the processor is further configured to determine the duration of the unit timeslot according to the real-time requirement of the second communications device.

17. A communications device, comprising:
a processor, configured to determine a first sub-timeslot and a second sub-timeslot in a unit timeslot; and
a transceiver, configured to perform communication in the first sub-timeslot by using a spectrum resource, wherein the communications device has a priority higher than that of a second communications device in a second communications system in the first sub-timeslot, and wherein the communications device has a priority lower than that of the second communications device in the second sub-timeslot;

wherein:
a duration for which the spectrum resource is idle when the transceiver performs communication in the first sub-timeslot by using the spectrum resource is less than a duration for which the second communications device waits to preempt the spectrum resource; and/or
a duration for which the spectrum resource is idle when the transceiver performs communication in the second sub-timeslot by using the spectrum resource is greater than a duration for which the second communications device waits to preempt the spectrum resource;

wherein the transceiver is further configured to perform communication in the second sub-timeslot in a first listen before talk (LBT) manner by using the spectrum resource, and the second communications device is configured to perform communication in the second sub-timeslot in a second LBT manner by using the spectrum resource;

wherein:
a minimum value of a duration of a contention window in the first LBT manner is greater than a minimum value of a duration of a contention window in the second LBT manner; or
a maximum value of the duration of the contention window in the first LBT manner is greater than a maximum value of the duration of the contention window in the second LBT manner; and wherein the duration for which the second communications device waits to preempt the spectrum resource comprises a sum of a distributed inter-frame spacing (DIFS) duration in the second LBT manner and the duration of the contention window in the second LBT manner.

* * * * *